United States Patent
Ueno et al.

(10) Patent No.: US 8,107,528 B2
(45) Date of Patent: Jan. 31, 2012

(54) PICTURE PROCESSING APPARATUS, PICTURE PROCESSING METHOD, INFORMATION PROCESSING APPARATUS, RECORDING MEDIUM, AND PROGRAM

(75) Inventors: Hiromichi Ueno, Kanagawa (JP); Shojiro Shibata, Kanagawa (JP); Goro Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1247 days.

(21) Appl. No.: 10/844,997

(22) Filed: May 13, 2004

(65) Prior Publication Data

US 2005/0002454 A1    Jan. 6, 2005

(30) Foreign Application Priority Data

May 14, 2003    (JP) .................................. 2003-135348

(51) Int. Cl.
*H04N 7/12*    (2006.01)
(52) U.S. Cl. ......... 375/240.03; 375/240.02; 375/240.12; 375/240.13
(58) Field of Classification Search ............. 375/240.02, 375/240.03, 240.12, 240.13
See application file for complete search history.

(56) References Cited

U.S. PATENT DOCUMENTS

| 5,731,837 A | * | 3/1998 | Hurst, Jr. ................. 375/240.03 |
| 6,560,282 B2 | * | 5/2003 | Tahara et al. ............ 375/240.02 |
| 2002/0186766 A1 | * | 12/2002 | Adelaide .................... 375/240.2 |

FOREIGN PATENT DOCUMENTS

| JP | 7 312756 | 11/1995 |
| JP | 2000 59788 | 2/2000 |
| JP | 2001 186517 | 7/2001 |
| JP | 2002 218464 | 8/2002 |

* cited by examiner

*Primary Examiner* — Jayanti K Patel
*Assistant Examiner* — Geepy Pe
(74) *Attorney, Agent, or Firm* — Frommer Lawrence & Haug LLP; William S. Frommer; Ellen Marcie Emas

(57) ABSTRACT

A reusable quantization value Qref included in history information or parameter information is obtained in step S21. In step S22, it is judged whether or not the quantization value Qref obtained in step S21 is smaller than a predetermined minimum quantization value Qmin. If it has been judged that the quantization value Qref is smaller than the predetermined minimum quantization value Qmin, the process proceeds to step S23, where the quantization value Q is set at Qmin, and then the process is completed. If it has been judged that the quantization value Qref is not smaller than the predetermined minimum quantization value Qmin, the process proceeds to step S24, where the quantization value Qref is reused and is set as the quantization value Q, and then the process is completed. The present invention can be applied to an SDTI CP-ASI converter or a long GOP encoder.

17 Claims, 18 Drawing Sheets

PICTURE PROCESSING APPARATUS, PICTURE PROCESSING METHOD, INFORMATION PROCESSING APPARATUS, RECORDING MEDIUM, AND PROGRAM

BACKGROUND OF THE INVENTION

1. Field of the Invention

The present invention relates to a picture processing apparatus, a picture processing method, an information processing apparatus, a recording medium, and a program. In particular, the present invention relates to a picture processing apparatus, a picture processing method, an information processing apparatus, a recording medium, and a program which are preferably used when corresponding data can be re-encoded by using information about a past encoding process performed thereon.

2. Description of the Related Art

In a system for transmitting a moving-picture signal to a remote location, such as a video conference system and a video telephone system, the moving-picture signal is compressed and encoded by using a line correlation or an inter-frame correlation of the picture signal, so as to efficiently use a transmission line.

The picture signal is compressed and encoded so that a bit stream to be generated has a predetermined bit rate. However, the bit rate of the bit stream may have to be changed according to the condition of a transmission line in an actual operation.

For example, when a transmitted picture signal is edited by a broadcasting station, the edit process is performed in units of seconds. Therefore, picture information of each frame should be independent from that of another frame. Accordingly, a long GOP (group of pictures, which is a group of frames having correlated information) including many frames so that the picture quality is not deteriorated even when transferred at a low bit rate (for example, 3 to 9 Mbps) and a short GOP including fewer frames transferred at a high bit rate (18 to 50 Mbps) need to be mutually converted.

For example, a system for encoding uncompressed data into MPEG long GOP stream data and then editing the frames thereof will be described with reference to FIG. 1.

An SDI (serial digital interface)-ASI (asynchronous serial interface) converter 1 encodes an input SDI picture into an MPEG long GOP (ASI stream) and outputs the encoded MPEG long GOP stream data. The SDI is a transmission scheme for uncompressed digital video/audio based on a point-to-point transmission, and is standardized by ANSI (American National Standards Institute)/SMPTE (Society of Motion Picture and Television Engineers) 259M.

An ASI-SDTI CP (serial data transport interface contents package) converter 2 decodes the supplied MPEG long GOP stream data by a decoding unit 21, encodes the entire stream data into intraframes by an encoding unit 22, and then outputs the encoded stream data composed of intraframes (SDTI CP stream) to a frame editor 3 of an SDTI CP interface. The SDTI CP is a global standard of a transmission scheme for transmitting MPEG data in real time (synchronous transfer), which is standardized as SMPTE 326M by the promotion of the Pro-MPEG forum.

The stream data which has been frame-edited by the frame editor 3 is supplied to an SDTI CP-ASI converter 4. The SDTI CP-ASI converter 4 decodes the supplied stream data composed of intraframes by a decoding unit 31, encodes it into an MPEG long GOP by an encoding unit 32, and then outputs the encoded MPEG long GOP stream data (ASI stream).

Next, a system for encoding an input picture into an MPEG long GOP at a high bit rate, decoding it, and then re-encoding it into a low-bit-rate MPEG long GOP will be described with reference to FIG. 2.

A long GOP encoder 51 decodes an input SDI picture by a decoding unit 61, encodes it into a high-bit-rate MPEG long GOP by an encoding unit 62, and then outputs the encoded MPEG long GOP stream (ASI stream) data. A long GOP encoder 52 decodes the supplied high-bit-rate MPEG long GOP by a decoding unit 71, encodes it into a low-bit-rate MPEG long GOP by an encoding unit 72, and then outputs the encoded low-bit-rate MPEG long GOP stream (ASI stream) data.

In such a case where picture information is repeatedly encoded and decoded, the picture information deteriorates if encoding parameters are changed at each encoding process. In order to prevent the deterioration of the picture information, a technique for suppressing picture deterioration caused by re-encoding is proposed in Patent Document 1 (Japanese Unexamined Patent Application Publication No. 2000-059788). In this technique, encoding history information inserted into a user data area in a picture layer of a bit stream is used.

FIG. 3 shows a system for encoding uncompressed data into MPEG long GOP stream data and then editing the frames thereof. In this system, encoding history information is used. In FIG. 3, parts corresponding to those in FIG. 1 are denoted by the same reference numerals, and the corresponding description will be omitted.

An ASI-SDTI CP converter 101 receives an MPEG long GOP (ASI stream) which has been generated by an encoding process performed by the SDI-ASI converter 1, which is the same as that in FIG. 1.

The MPEG long GOP is composed of three types of pictures (I-picture, P-picture, and B-picture), each having a different encoding feature. Therefore, video data generated by decoding the MPEG long GOP includes frames, each having the feature of I-picture, P-picture, or B-picture. When the video data is re-encoded into an MPEG long GOP, the picture quality may be deteriorated if each of the I-picture, P-picture, and B-picture in the video data is encoded with another picture type. For example, if video data which was a B-picture before decoding (the B-picture is more likely to have distortion than an I-picture and a P-picture) is encoded as an I-picture, neighboring pictures are predictively encoded by using the I-picture having much distortion as a reference picture. Accordingly, the picture quality deteriorates.

In order to prevent the deterioration of the picture quality caused by re-encoding, the ASI-SDTI CP converter 101 decodes the supplied MPEG long GOP stream data by a decoding unit 111, and then encodes the entire stream data into intraframes by an encoding unit 112. At this time, the ASI-SDTI CP converter 101 adds parameters such as a picture type and a quantization value used in a past encoding process, that is, in the encoding process performed by the SDI-ASI converter 1, as history information (history data) of SMPTE 328M to the SDTI CP stream composed of intraframes, which is then supplied to the frame editor 3.

The stream data is frame-edited by the frame editor 3 and is then supplied to an SDTI CP-ASI converter 102. The SDTI CP-ASI converter 102 decodes the supplied stream data composed of intraframes added with the history information by a decoding unit 121. Then, an encoding unit 122 re-encodes the stream data into a long GOP by using necessary parameters, such as a picture type and a quantization value, which are included in the decoded history information, and then outputs the long GOP.

In the system shown in FIG. 2, an input picture is encoded into an MPEG long GOP at a high bit rate, and the MPEG long GOP is decoded and is then re-encoded into a low-bit-rate MPEG long GOP. FIG. 4 shows a case where the picture quality is not deteriorated due to a re-encoding process in the system shown in FIG. 2. In FIG. 4, parts corresponding to those in FIG. 2 are denoted by the same reference numerals, and the corresponding description will be omitted.

A long GOP encoder 131 receives MPEG long GOP stream (ASI stream) data, which has been encoded by the long GOP encoder 51, and decodes the high-bit-rate MPEG long GOP by a decoding unit 141. At this time, the long GOP encoder 131 obtains necessary encoding parameters and supplies them to an encoding unit 142 together with the decoded video data. The encoding unit 142 encodes the video data into a low-bit-rate MPEG long GOP by using the supplied encoding parameters, and outputs the encoded low-bit-rate MPEG long GOP stream (ASI stream) data.

As described above, deterioration of the picture quality can be prevented by encoding video data by reusing information about past encoding, such as history information or encoding parameters (picture type, motion vector, and quantization value in the past encoding). However, as in the system shown in FIG. 3, when a process of encoding entire data into intraframes is performed between the past encoding process, in which data is encoded into an MPEG long-GOP, and the encoding process by reusing parameters, a VBV buffer failure may be caused at re-encoding.

The VBV buffer failure at re-encoding is caused in the following case. That is, a picture encoded in a past encoding process is distorted due to an insufficiently high bit rate of an intermediate encoding process (process of encoding entire data into intraframes). If a quantization value which was used for encoding an undistorted picture is used for re-encoding the distorted picture, the VBV buffer failure occurs.

More specifically, when an SDI static picture is encoded into an MPEG long GOP by the SDI-ASI converter 1, a large amount of code is generated in an I-picture, whereas a small amount of code is generated in P- and B-pictures, as shown in FIG. 5, which illustrates the track of the VBV buffer. This is because the I-picture forms the most part of the input picture and that the following P- and B-pictures are encoded with a minor differential thereof. When all of these pictures are encoded into intraframes by the ASI-SDTI CP converter 101, the encoding can be performed faithfully to the picture which has been previously encoded if a sufficiently high bit rate is used. However, if the bit rate is low, the previously-encoded picture is encoded so as to have distortion.

Assume that the distorted picture is re-encoded by using a quantization value or the like used in the past encoding process performed by the SDI-ASI converter 1 in the SDTI CP-ASI converter 102. In this case, as shown in FIG. 6, the amount of generated code is small in the picture which was an I-picture because data mainly composed of high-frequency components has been reduced. On the other hand, in the pictures which were P- and B-pictures, data having a differential increased by distortion is encoded by using a quantization value which was used in the SDI-ASI converter 1, which has encoded small-differential data. Accordingly, a large amount of code is generated in the re-encoding process performed by the SDTI CP-ASI converter 102, so that a VBV buffer failure is caused.

SUMMARY OF THE INVENTION

The present invention has been made in view of these circumstances, and an object of the present invention is to prevent a buffer failure caused when a quantization value used in a past encoding process is reused in an encoding process performed by using history information or past encoding parameters.

According to a first aspect of the present invention, a picture processing apparatus includes an obtaining unit for obtaining information about a past encoding process performed on picture data; a setting unit for setting a quantization value; a quantization unit for performing quantization based on the quantization value set by the setting unit; and an encoding unit for encoding coefficient data quantized by the quantization unit. If a predetermined condition has been satisfied, the setting unit sets the quantization value at a second quantization value or a larger value, the second quantization value being larger than a first quantization value, which is a minimum value in the range of quantization values which can be set by the setting unit.

If it has been judged that a third quantization value, which was used in the past encoding process and which is included in the information obtained by the obtaining unit, is reusable, the setting unit is allowed to judge that the predetermined condition has been satisfied and to set the larger value of the second and third quantization values as the quantization value.

If it has been judged that a part to be quantized in the picture data corresponds to a part which can be encoded without referring to another part and that a third quantization value, which was used in the past encoding process and which is included in the information obtained by the obtaining unit, is reusable, the setting unit is allowed to judge that the predetermined condition has been satisfied and to set the larger value of the second and third quantization values as the quantization value.

If a part to be quantized in the picture data is an intraframe, the setting unit is allowed to judge that the part can be encoded without referring to another part.

If a part to be quantized in the picture data is an intra-slice, the setting unit is allowed to judge that the part can be encoded without referring to another part.

If a part to be quantized in the picture data is an intra-macroblock, the setting unit is allowed to judge that the part can be encoded without referring to another part.

The picture processing apparatus may further include a storage unit for storing a plurality of second quantization values corresponding to a bit rate in the immediately preceding encoding process. The setting unit is allowed to select one of the plurality of second quantization values stored in the storage unit based on the bit rate in the immediately preceding encoding process, and to set the quantization value at the selected second quantization value or a larger value.

If it has been judged that the information about the past encoding process is reusable and that a third quantization value, which was used in the past encoding process and which is included in the information about the past encoding process, is reusable, the setting unit is allowed to judge that the predetermined condition has been satisfied and to set the larger value of the second and third quantization values as the quantization value.

According to a second aspect of the present invention, a picture processing method includes a judging step of judging whether or not a quantization value included in information about a past encoding process performed on picture data is reusable; and a setting step of setting the quantization value at a second quantization value or a larger value, the second quantization value being larger than a first quantization value, which is a minimum value in the range of quantization values which can be set by the setting step, if it has been judged in the judging step that the quantization value included in the information is reusable.

According to a third aspect of the present invention, a program recorded on a recording medium includes a judging step of judging whether or not a quantization value included in information about a past encoding process performed on picture data is reusable; and a setting step of setting the quantization value at a second quantization value or a larger value, the second quantization value being larger than a first quantization value, which is a minimum value in the range of quantization values which can be set by the setting step, if it has been judged in the judging step that the quantization value included in the information is reusable.

According to a fourth aspect of the present invention, a program includes a judging step of judging whether or not a quantization value included in information about a past encoding process performed on picture data is reusable; and a setting step of setting the quantization value at a second quantization value or a larger value, the second quantization value being larger than a first quantization value, which is a minimum value in the range of quantization values which can be set by the setting step, if it has been judged in the judging step that the quantization value included in the information is reusable.

In the picture processing apparatus, the picture processing method, and the program according to the first to fourth aspects of the present invention, information about a past encoding process performed on picture data is obtained, and it is judged whether or not a quantization value included in the information is reusable. If it has been judged that the quantization value included in the information is reusable, the quantization value is set at a second quantization value or a larger value, the second quantization value being larger than a first quantization value, which is a minimum value in the range of quantization values which can be set by a setting unit. Then, quantization is performed by using the set quantization value and quantized coefficient data is encoded.

According to a fifth aspect of the present invention, an information processing apparatus includes a decoding unit for completely or incompletely decoding supplied picture data; and an encoding unit for encoding, to a mid-stage or completely, the picture data of a base band which has been completely decoded by the decoding unit or the picture data which has been incompletely decoded by the decoding unit so as to be encoded to a mid-stage. The encoding unit includes an obtaining unit for obtaining information about a past encoding process performed on the picture data; a setting unit for setting a quantization value; a quantization unit for performing quantization based on the quantization value set by the setting unit; and an encoding unit for encoding coefficient data quantized by the quantization unit. If a predetermined condition has been satisfied, the setting unit sets the quantization value at a second quantization value or a larger value, the second quantization value being larger than a first quantization value, which is a minimum value in the range of quantization values which can be set by the setting unit.

In the information processing apparatus according to the fifth aspect of the present invention, supplied picture data is completely or incompletely decoded, and picture data of a base band or picture data which has been encoded to a mid-stage is encoded to a mid-stage or completely. In the encoding process, information about a past encoding process performed on the picture data is obtained. If a predetermined condition has been satisfied, a quantization value is set at a second quantization value or a larger value, the second quantization value being larger than a first quantization value, which is a minimum value in the range of quantization values which can be set by a setting unit. Then, quantization is performed based on the set quantization value and quantized coefficient data is encoded.

According to a sixth aspect of the present invention, a picture processing apparatus includes an obtaining unit for obtaining information about a past encoding process performed on picture data; a setting unit for setting a quantization value; a quantization unit for performing quantization based on the quantization value set by the setting unit; and an encoding unit for encoding coefficient data quantized by the quantization unit. If a predetermined condition has been satisfied, the setting unit sets the quantization value at a second quantization value or a larger value, the second quantization value being larger than a first quantization value, which is a minimum value in the range of quantization values which can be set in a standard of an encoding process performed by the encoding unit.

If it has been judged that a third quantization value, which was used in the past encoding process and which is included in the information obtained by the obtaining unit, is reusable, the setting unit is allowed to judge that the predetermined condition has been satisfied and to set the larger value of the second and third quantization values as the quantization value.

If it has been judged that a part to be quantized in the picture data corresponds to a part which can be encoded without referring to another part and that a third quantization value, which was used in the past encoding process and which is included in the information obtained by the obtaining unit, is reusable, the setting unit is allowed to judge that the predetermined condition has been satisfied and to set the larger value of the second and third quantization values as the quantization value.

If a part to be quantized in the picture data is an intraframe, the setting unit is allowed to judge that the part can be encoded without referring to another part.

If a part to be quantized in the picture data is an intra-slice, the setting unit is allowed to judge that the part can be encoded without referring to another part.

If a part to be quantized in the picture data is an intra-macroblock, the setting unit is allowed to judge that the part can be encoded without referring to another part.

The picture processing apparatus may further include a storage unit for storing a plurality of second quantization values corresponding to a bit rate in the immediately preceding encoding process. The setting unit is allowed to select one of the plurality of second quantization values stored in the storage unit based on the bit rate in the immediately preceding encoding process, and to set the quantization value at the selected second quantization value or a larger value.

If it has been judged that the information about the past encoding process is reusable and that a third quantization value, which was used in the past encoding process and which is included in the information about the past encoding process, is reusable, the setting unit is allowed to judge that the predetermined condition has been satisfied and to set the larger value of the second and third quantization values as the quantization value.

According to a seventh aspect of the present invention, a picture processing method includes a judging step of judging whether or not a quantization value included in information about a past encoding process performed on picture data is reusable; and a setting step of setting the quantization value at a second quantization value or a larger value, the second quantization value being larger than a first quantization value, which is a minimum value in the range of quantization values which can be set in a standard of an encoding process, if it has been judged in the judging step that the quantization value included in the information is reusable.

According to an eighth aspect of the present invention, a program recorded on a recording medium includes a judging step of judging whether or not a quantization value included in information about a past encoding process performed on picture data is reusable; and a setting step of setting the quantization value at a second quantization value or a larger value, the second quantization value being larger than a first quantization value, which is a minimum value in the range of quantization values which can be set in a standard of an encoding process, if it has been judged in the judging step that the quantization value included in the information is reusable.

According to a ninth aspect of the present invention, a program includes a judging step of judging whether or not a quantization value included in information about a past encoding process performed on picture data is reusable; and a setting step of setting the quantization value at a second quantization value or a larger value, the second quantization value being larger than a first quantization value, which is a minimum value in the range of quantization values which can be set in a standard of an encoding process, if it has been judged in the judging step that the quantization value included in the information is reusable.

In the picture processing apparatus, the picture processing method, and the program according to the sixth to ninth aspects of the present invention, information about a past encoding process performed on picture data is obtained, and it is judged whether or not a quantization value included in the information is reusable. If it has been judged that the quantization value included in the information is reusable, the quantization value is set at a second quantization value or a larger value, the second quantization value being larger than a first quantization value, which is a minimum value in the range of quantization values which can be set in a standard of an encoding process. Then, quantization is performed by using the set quantization value and quantized coefficient data is encoded.

According to a tenth aspect of the present invention, an information processing apparatus includes a decoding unit for completely or incompletely decoding supplied picture data; and an encoding unit for encoding, to a mid-stage or completely, the picture data of a base band which has been completely decoded by the decoding unit or the picture data which has been incompletely decoded by the decoding unit so as to be encoded to a mid-stage. The encoding unit includes an obtaining unit for obtaining information about a past encoding process performed on the picture data; a setting unit for setting a quantization value; a quantization unit for performing quantization based on the quantization value set by the setting unit; and an encoding unit for encoding coefficient data quantized by the quantization unit. If a predetermined-condition has been satisfied, the setting unit sets the quantization value at a second quantization value or a larger value, the second quantization value being larger than a first quantization value, which is a minimum value in the range of quantization values which can be set in a standard of an encoding process performed by the encoding unit.

In the information processing apparatus according to the tenth aspect of the present invention, supplied picture data is completely or incompletely decoded, and picture data of a base band or picture data which has been encoded to a mid-stage is encoded to a mid-stage or completely. In the encoding process, information about a past encoding process performed on the picture data is obtained. If a predetermined condition has been satisfied, a quantization value is set at a second quantization value or a larger value, the second quantization value being larger than a first quantization value, which is a minimum value in the range of quantization values which can be set in a standard of an encoding process. Then, quantization is performed based on the set quantization value and quantized coefficient data is encoded.

According to the present invention, picture data can be encoded. In particular, a minimum quantization value can be set at a value larger than a minimum value in the range of quantization values which can be set by the setting unit or which can be set in a standard of an encoding process. Accordingly, deterioration in the picture quality can be prevented.

Also, according to the present invention, picture data can be converted. Further, in an encoding process in the converting process, a minimum quantization value can be set at a value larger than a minimum value in the range of quantization values which can be set by the setting unit or which can be set in a standard of an encoding process. Accordingly, deterioration in the picture quality can be prevented.

DESCRIPTION OF THE PREFERRED EMBODIMENT

Figure 1:
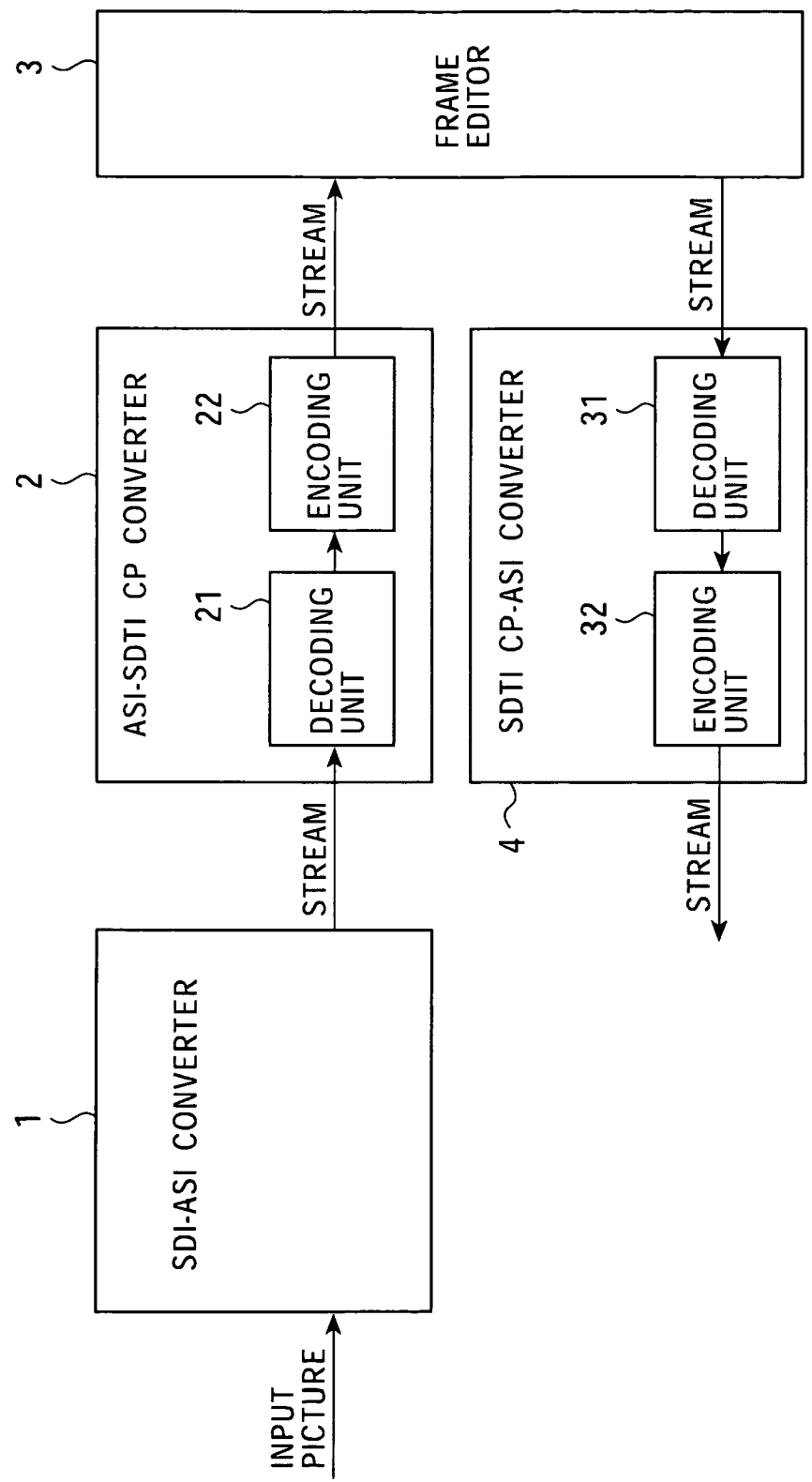
FIG. 1 shows a known system for performing re-encoding in frame edit.
Figure 2:
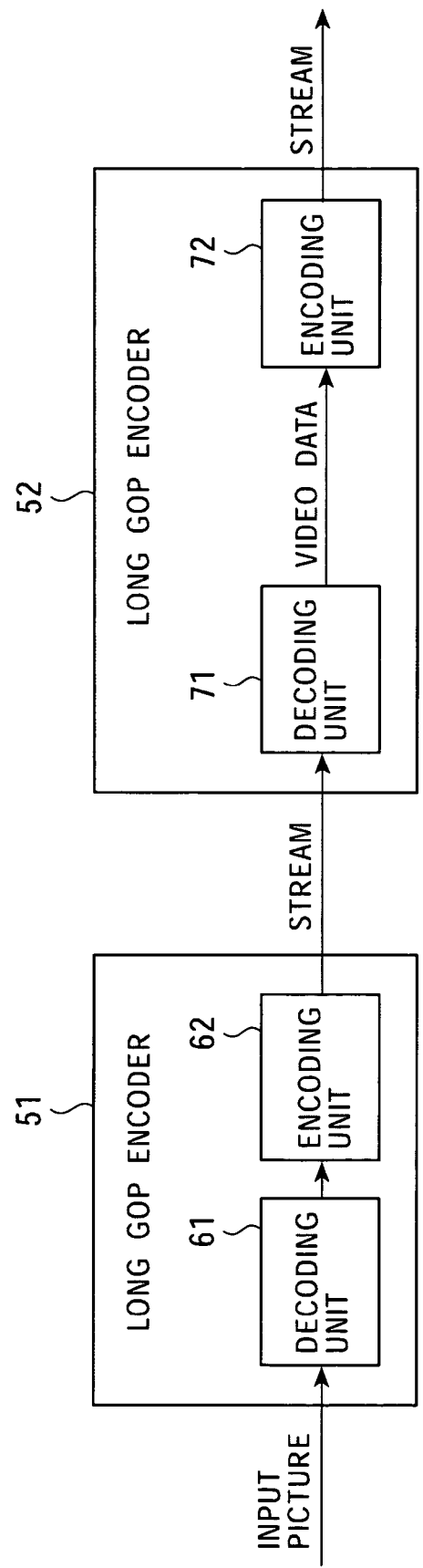
FIG. 2 shows a known system for performing re-encoding by changing the bit rate of an MPEG long GOP.

Hereinafter, an embodiment of the present invention will be described. First, in order to explain the correspondence between each unit described in the summary of the invention and the following embodiment, the feature of the present invention will be described by attaching a corresponding embodiment (just an example) in parentheses after each unit or step. Of course, this description is not intended for limiting each unit or step to the embodiment.

The picture processing apparatus according to the first aspect of the present invention (e.g. encoding unit 161 in FIG. 7, encoding unit 211 in FIG. 9, encoding unit 251 in FIG. 13, or encoding unit 281 in FIG. 14) includes an obtaining unit (e.g. history extracting unit 171 in FIG. 8 or 13 or parameter input unit 221 in FIG. 10 or 14) for obtaining information (e.g. history information or parameters) about a past encoding process performed on picture data; a setting unit (e.g. quantization-value setting unit 177 in FIG. 8 or 10 or quantization-value setting unit 261 in FIG. 13 or 14) for setting a quantization value; a quantization unit (e.g. quantization unit 176 in FIG. 8, 13, 10, or 14) for performing quantization based on the quantization value set by the setting unit; and an encoding unit (e.g. VLC unit 178 in FIG. 8, 13, 10, or 14) for encoding coefficient data quantized by the quantization unit. If a predetermined condition has been satisfied, the setting unit sets the quantization value at a second quantization value or a larger value, the second quantization value being larger than a first quantization value, which is a minimum value in the range of quantization values which can be set by the setting unit.

If it has been judged that a part to be quantized in the picture data corresponds to a part which can be encoded without referring to another part (e.g. I-picture, intra-slice, or intra-macroblock) and that a third quantization value, which was used in the past encoding process and which is included in the information obtained by the obtaining unit, is reusable, the setting unit of the picture processing apparatus judges that the predetermined condition has been satisfied and sets the larger value of the second and third quantization values as the quantization value.

The picture processing apparatus further includes a storage unit (e.g. memory 262 in FIG. 13 or 14) for storing a plurality of second quantization values corresponding to a bit rate in the immediately preceding encoding process. The setting unit selects one of the plurality of second quantization values stored in the storage unit based on the bit rate in the immediately preceding encoding process, and sets the quantization value at the selected second quantization value or a larger value.

The picture processing method according to the second aspect of the present invention, the program recorded on the recording medium according to the third aspect of the present invention, and the program according to the fourth aspect of the present invention include a judging step (e.g. step S2 in FIG. 11 or step S62 in FIG. 16) of judging whether or not a quantization value included in information (e.g. history information or parameters) about a past encoding process performed on picture data is reusable; and a setting step (e.g. steps S22 to S24 in FIG. 12 or steps S45 to S47 in FIG. 15) of setting the quantization value at a second quantization value or a larger value, the second quantization value being larger than a first quantization value, which is a minimum value in the range of quantization values which can be set by the setting step, if it has been judged in the judging step that the quantization value included in the information is reusable.

The information processing apparatus according to the fifth aspect of the present invention (e.g. SDTI CP-ASI converter 151 in FIG. 7 or long GOP encoder 201 in FIG. 9) includes a decoding unit (e.g. decoding unit 121 in FIG. 7 or decoding unit 141 in FIG. 9) for completely or incompletely decoding supplied picture data; and an encoding unit (e.g. encoding unit 161 in FIG. 7, encoding unit 211 in FIG. 9, encoding unit 251 in FIG. 13, or encoding unit 281 in FIG. 14) for encoding, to a mid-stage or completely, the picture data of a base band which has been completely decoded by the decoding unit or the picture data which has been incompletely decoded by the decoding unit so as to be encoded to a mid-stage. The encoding unit includes an obtaining unit (e.g. history extracting unit 171 in FIG. 8 or 13 or parameter input unit 221 in FIG. 10 or 14) for obtaining information (e.g. history information or parameters) about a past encoding process performed on the picture data; a setting unit (e.g. quantization-value setting unit 177 in FIG. 8 or 10 or quantization-value setting unit 261 in FIG. 13 or 14) for setting a quantization value; a quantization unit (e.g. quantization unit 176 in FIG. 8, 13, 10, or 14) for performing quantization based on the quantization value set by the setting unit; and an encoding unit (e.g. VLC unit 178 in FIG. 8, 13, 10, or 14) for encoding coefficient data quantized by the quantization unit. If a predetermined condition has been satisfied, the setting unit sets the quantization value at a second quantization value or a larger value, the second quantization value being larger than a first quantization value, which is a minimum value in the range of quantization values which can be set by the setting unit.

The picture processing apparatus according to the sixth aspect of the present invention (e.g. encoding unit 161 in FIG. 7, encoding unit 211 in FIG. 9, encoding unit 251 in FIG. 13, or encoding unit 281 in FIG. 14) includes an obtaining unit (e.g. history extracting unit 171 in FIG. 8 or 13 or parameter input unit 221 in FIG. 10 or 14) for obtaining information (e.g. history information or parameters) about a past encoding process performed on picture data; a setting unit (e.g. quantization-value setting unit 177 in FIG. 8 or 10 or quantization-value setting unit 261 in FIG. 13 or 14) for setting a quantization value; a quantization unit (e.g. quantization unit 176 in FIG. 8, 13, 10, or 14) for performing quantization based on the quantization value set by the setting unit; and an encoding unit (e.g. VLC unit 178 in FIG. 8, 13, 10, or 14) for encoding coefficient data quantized by the quantization unit. If a predetermined condition has been satisfied, the setting unit sets the quantization value at a second quantization value or a larger value, the second quantization value being larger than a first quantization value, which is a minimum value in the range of quantization values which can be set in a standard (e.g. MPEG 2) of an encoding process performed by the encoding unit.

If it has been judged that a part to be quantized in the picture data corresponds to a part which can be encoded without referring to another part (e.g. I-picture, intra-slice, or intra-macroblock) and that a third quantization value, which was used in the past encoding process and which is included in the information obtained by the obtaining unit, is reusable, the setting unit of the picture processing apparatus judges that the predetermined condition has been satisfied and sets the larger value of the second and third quantization values as the quantization value.

The picture processing apparatus further includes a storage unit (e.g. memory 262 in FIG. 13 or 14) for storing a plurality of second quantization values corresponding to a bit rate in the immediately preceding encoding process. The setting unit selects one of the plurality of second quantization values stored in the storage unit based on the bit rate in the immediately preceding encoding process, and sets the quantization value at the selected second quantization value or a larger value.

The picture processing method according to the seventh aspect of the present invention, the program recorded on the recording medium according to the eighth aspect of the present invention, and the program according to the ninth aspect of the present invention include a judging step (e.g. step S2 in FIG. 11 or step S62 in FIG. 16) of judging whether or not a quantization value included in information (e.g. history information or parameters) about a past encoding process performed on picture data is reusable; and a setting step (e.g. steps S22 to S24 in FIG. 12 or steps S45 to S47 in FIG. 15) of setting the quantization value at a second quantization value or a larger value, the second quantization value being larger than a first quantization value, which is a minimum value in the range of quantization values which can be set in a standard (e.g. MPEG 2) of an encoding process, if it has been judged in the judging step that the quantization value included in the information is reusable.

The information processing apparatus according to the tenth aspect of the present invention (e.g. SDTI CP-ASI converter 151 in FIG. 7 or long GOP encoder 211 in FIG. 9) includes a decoding unit (e.g. decoding unit 121 in FIG. 7 or decoding unit 141 in FIG. 9) for completely or incompletely decoding supplied picture data; and an encoding unit (e.g. encoding unit 161 in FIG. 7, encoding unit 211 in FIG. 9, encoding unit 251 in FIG. 13, or encoding unit 281 in FIG. 14) for encoding, to a mid-stage or completely, the picture data of a base band which has been completely decoded by the decoding unit or the picture data which has been incompletely decoded by the decoding unit so as to be encoded to a mid-stage. The encoding unit includes an obtaining unit (e.g. history extracting unit 171 in FIG. 8 or 13 or parameter input unit 221 in FIG. 10 or 14) for obtaining information (e.g. history information or parameters) about a past encoding process performed on the picture data; a setting unit (e.g. quantization-value setting unit 177 in FIG. 8 or 10 or quantization-value setting unit 261 in FIG. 13 or 14) for setting a quantization value; a quantization unit (e.g. quantization unit 176 in FIG. 8, 13, 10, or 14) for performing quantization based on the quantization value set by the setting unit; and an encoding unit (e.g. VLC unit 178 in FIG. 8, 13, 10, or 14) for encoding coefficient data quantized by the quantization unit. If a predetermined condition has been satisfied, the setting unit sets the quantization value at a second quantization value or a larger value, the second quantization value being larger than a first quantization value, which is a minimum value in the range of quantization values which can be set in a standard (e.g. MPEG 2) of an encoding process performed by the encoding unit.

Hereinafter, the embodiment of the present invention will be described with reference to the drawings.

Figure 7:
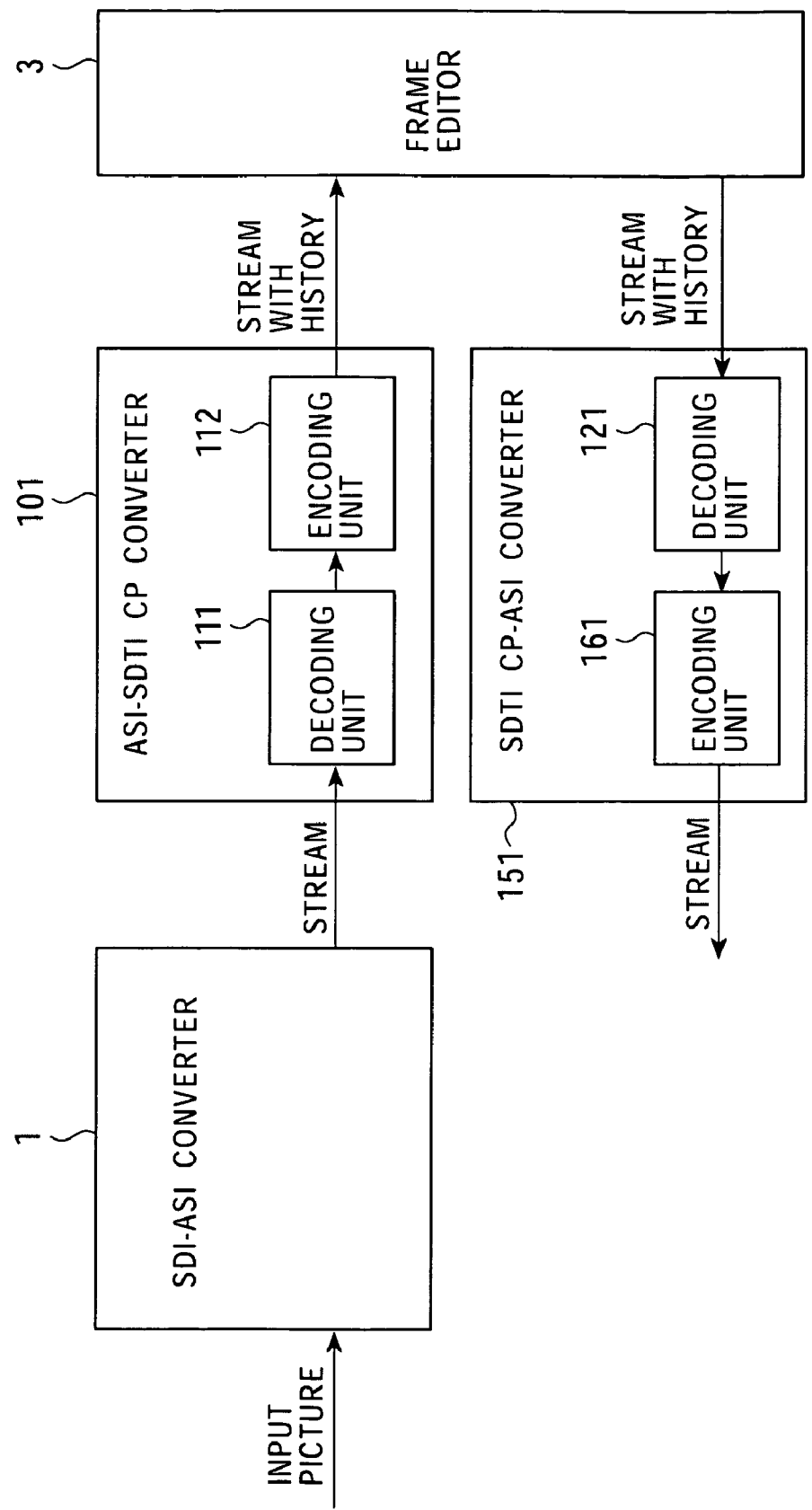
FIG. 7 is a block diagram showing the configuration of a system of the present invention for performing re-encoding in frame edit.

FIG. 7 is a block diagram showing the configuration of a system of the present invention for encoding uncompressed data into MPEG long GOP stream data and for editing the frames thereof.

Figure 3:
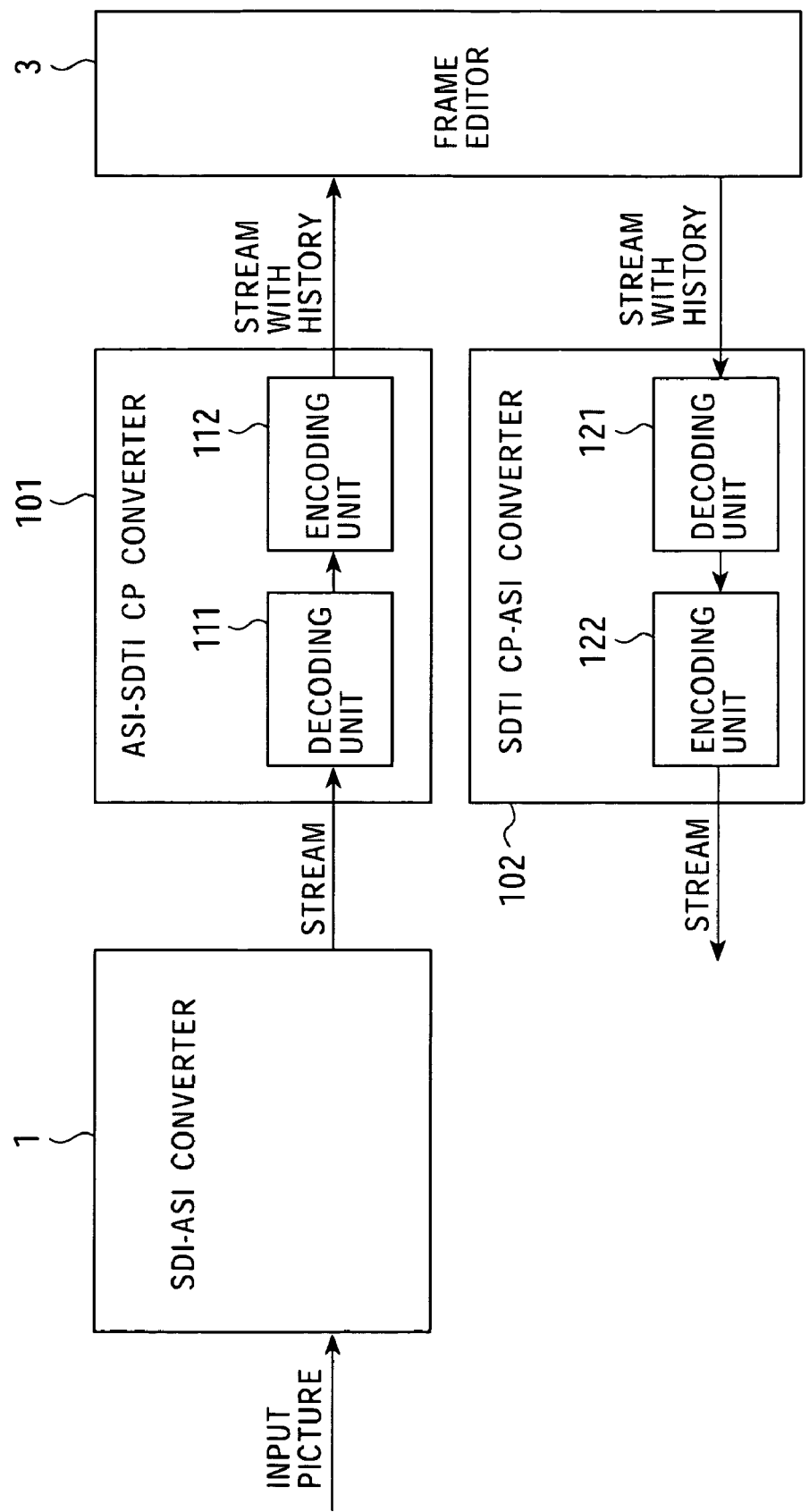
FIG. 3 shows a known system for performing re-encoding in frame edit in which encoding history information is used.

In FIG. 7, parts corresponding to those of the known art, which has been described with reference to FIG. 3, are denoted by the same reference numerals, and the corresponding description will be omitted. That is, the system of the present invention for encoding uncompressed data into MPEG long GOP stream data and for editing the frames thereof has basically the same configuration as that of the known art shown in FIG. 3, except that an SDTI CP-ASI converter 151 is provided instead of the SDTI CP-ASI converter 102. Also, the SDTI CP-ASI converter 151 has basically the same configuration as that of the SDTI CP-ASI converter 102, except that an encoding unit 161 which can set a minimum quantization value at a predetermined value is provided instead of the encoding unit 122.

The ASI-SDTI CP converter 101 receives an MPEG long GOP (ASI stream) generated by the encoding process in the SDI-ASI converter 1.

The MPEG long GOP is composed of three types of pictures (I-picture, P-picture, and B-picture). The ASI-SDTI CP converter 101 decodes the received MPEG long GOP stream data by the decoding unit 111 and then encodes the entire stream data into intraframes by the encoding unit 112. At this time, parameters such as a picture type and a quantization value used in the past encoding process, that is, in the encoding process performed by the SDI-ASI converter 1, are added as history information (history data) of SMPTE 328M to the SDTI CP stream composed of intraframes, which is then supplied to the frame editor 3. Accordingly, video data having a feature of an I-picture, a P-picture, or a B-picture is prevented from being encoded with another picture type when the stream data is re-encoded into a long GOP in the following process.

The stream data with the history information is frame-edited by the frame editor 3, and is then supplied to the SDTI CP-ASI converter 151. The SDTI CP-ASI converter 151 decodes the supplied stream data composed of intraframes with the history information by the decoder 121. Then, the encoding unit 161 re-encodes the stream data into a long GOP by using parameters as necessary, such as a picture type and a quantization value, which are included in the decoded history information, and outputs the generated long GOP.

Figure 8:
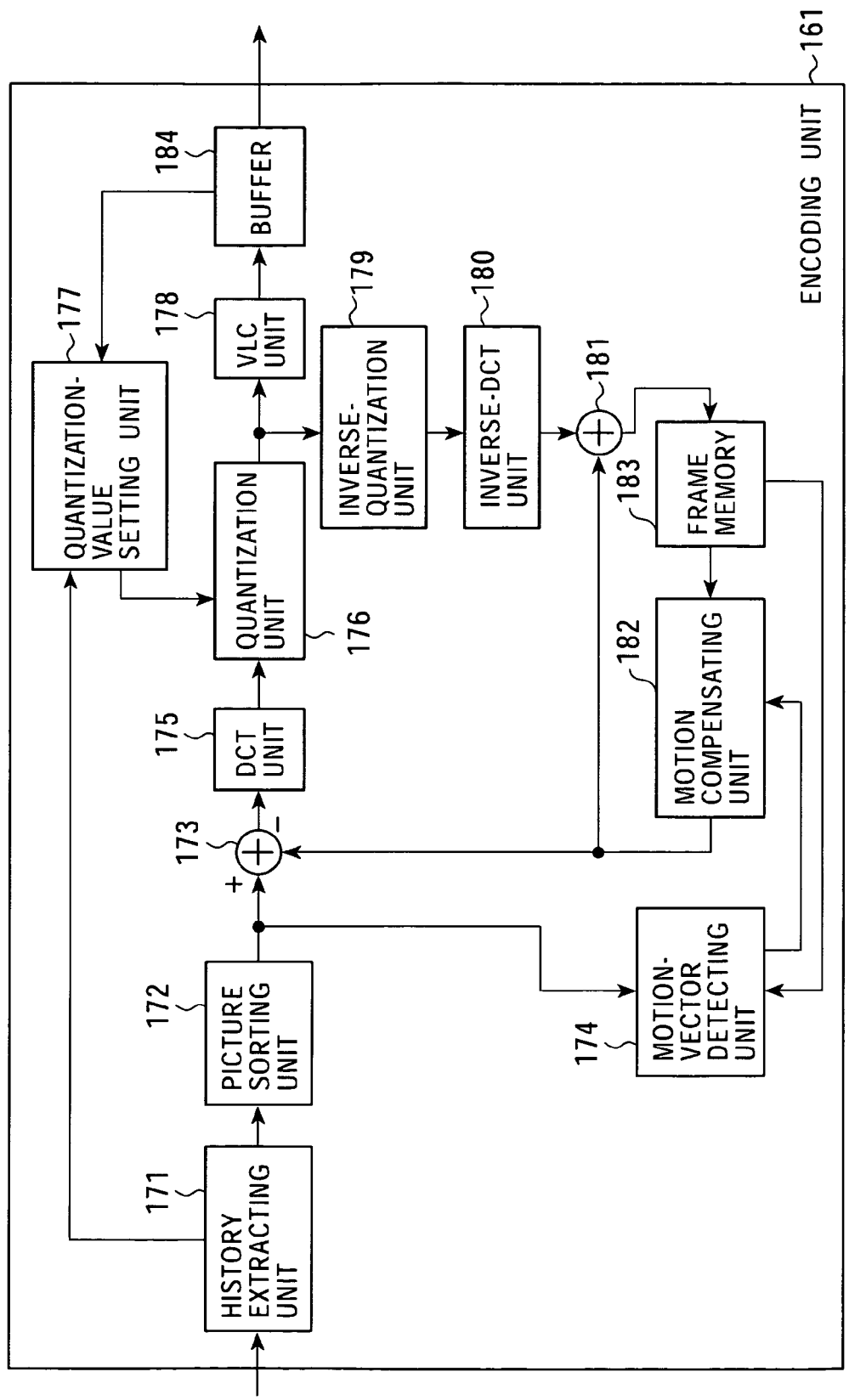
FIG. 8 is a block diagram showing the configuration of an encoding unit shown in FIG. 7.

FIG. 8 is a block diagram showing the configuration of the encoding unit 161.

A history extracting unit 171 extracts the history information from the SDTI CP stream including the history information, which has been decoded by the decoding unit 121, and supplies the history information to a quantization-value setting unit 177 and also supplies the video stream to a picture sorting unit 172. The history information includes information about a past encoding process, such as a picture type, a quantization value, a motion vector, and a quantization matrix.

The picture sorting unit 172 sorts sequentially-input frame pictures of picture data as necessary. Also, the picture sorting unit 172 generates macroblock data, which is generated by dividing each frame picture of the picture data into macroblocks, each including a 16 pixels×16 lines luminance signal and a color-difference signal corresponding to the luminance signal, and supplies the macroblock data to an operating unit 173 and a motion-vector detecting unit 174.

The motion-vector detecting unit 174 receives the macroblock data, calculates the motion vector of each macroblock based on the macroblock data and on reference-picture data stored in a frame memory 183, and transmits the calculation result as motion-vector data to a motion compensating unit 182.

The operating unit 173 performs motion compensation for the macroblock data supplied from the picture sorting unit 172 based on the picture type of each macroblock. More specifically, the operating unit 173 performs motion compensation in an intra mode for an I-picture, a forward prediction mode for a P-picture, and a bidirectional prediction mode for a B-picture.

In the intra mode, a frame picture to be encoded is regarded as transmission data. In the forward prediction mode, a predictive residual between a frame picture to be encoded and a past reference picture is regarded as transmission data. In the bidirectional prediction mode, a predictive residual between a frame picture to be encoded and past/future reference pictures is regarded as transmission data.

When the macroblock data is an I-picture, the macroblock data is processed in the intra mode. That is, the operating unit 173 transmits the macroblock of the input macroblock data as-is as operation data to a discrete cosine transform (DCT) unit 175. The DCT unit 175 performs a DCT process on the input operation data so as to generate a DCT coefficient, which is transmitted to a quantization unit 176 as DCT coefficient data.

The quantization unit 176 quantizes the input DCT coefficient data based on a quantization value Q supplied from the quantization-value setting unit 177, and transmits the quantized DCT coefficient data to a variable length coding (VLC) unit 178 and an inverse-quantization unit 179. Herein, the quantization unit 176 adjusts a quantization step size in a quantization process according to the quantization value Q supplied from the quantization-value setting unit 177, so as to control the amount of generated code.

The quantized DCT coefficient data transmitted to the inverse-quantization unit 179 is inversely-quantized with the same quantization step size as that in the quantization unit 176, and is transmitted as DCT coefficient data to an inverse-DCT unit 180. The inverse-DCT unit 180 performs an inverse-DCT process on the supplied DCT coefficient data so as to generate operation data, which is transmitted to an operating unit 181 and is stored as reference-picture data in the frame memory 183.

When the macroblock data is a P-picture, the operating unit 173 performs a motion compensating process in the forward prediction mode on the macroblock data. When the macroblock data is a B-picture, the operating unit 173 performs a motion compensating process in the bidirectional prediction mode on the macroblock data.

The motion compensating unit 182 performs motion compensation on the reference-picture data stored in the frame memory 183 in accordance with the motion-vector data and calculates forward prediction picture data or bidirectional prediction picture data. The operating unit 173 performs a subtraction process on the macroblock data by using the forward prediction picture data or the bidirectional prediction picture data supplied from the motion compensating unit 182.

That is, in the forward prediction mode, the motion compensating unit 182 reads the reference-picture data by displacing a read address of the frame memory 183 according to the motion-vector data, and supplies the reference-picture data as forward prediction picture data to the operating units 173 and 181. The operating unit 173 subtracts the forward prediction picture data from the supplied macroblock data so as to obtain differential data as a predictive residual. Then, the operating unit 173 transmits the differential data to the DCT unit 175.

The forward prediction picture data is supplied from the motion compensating unit 182 to the operating unit 181. The operating unit 181 adds the forward prediction picture data to the operation data supplied from the inverse-DCT unit 180 so as to locally reproduce the reference-picture data, which is output to and stored in the frame memory 183.

On the other hand, in the bidirectional prediction mode, the motion compensating unit 182 reads the reference-picture data by displacing a read address of the frame memory 183 according to the motion-vector data, and supplies the reference-picture data as bidirectional prediction picture data to the operating units 173 and 181. The operating unit 173 subtracts the bidirectional prediction picture data from the supplied macroblock data so as to obtain differential data as a predictive residual. Then, the operating unit 173 transmits the differential data to the DCT unit 175.

The bidirectional prediction picture data is supplied from the motion compensating unit 182 to the operating unit 181. The operating unit 181 adds the bidirectional prediction picture data to the operation data supplied from the inverse-DCT unit 180 so as to locally reproduce the reference-picture data, which is output to and stored in the frame memory 183.

Accordingly, the picture data input to the encoding unit 161 is processed by a motion-compensation prediction process, a DCT process, and a quantization process, and is supplied as quantized DCT coefficient data to the VLC unit 178. The VLC unit 178 performs a variable length coding (VLC) process on the quantized DCT coefficient data based on a predetermined conversion table, and transmits the obtained VLC data to a buffer 184. The buffer 184 buffers the supplied VLC data and outputs it.

The quantization-value setting unit 177 continuously monitors the accumulation status of the VLC data stored in the buffer 184, and sets a quantization step size based on occupancy-rate information representing the accumulation status or on the history information supplied from the history extracting unit 171.

The quantization-value setting unit 177 judges whether or not an encoding process can be performed by using the history information based on a signal indicating a user's operation input supplied from an operation input unit (not shown) or on whether or not the history information has been supplied from the history extracting unit 171. As described above, the history information supplied from the history extracting unit 171 includes a picture type, a quantization value, a motion vector, and a quantization matrix. If the quantization-value setting unit 177 has judged that an encoding process can be performed by using the history information, it also judges whether or not a quantization value can be reused based on the history information supplied from the history extracting unit 171.

Whether or not the quantization value can be reused may be set in advance by the user. Alternatively, information indicating whether or not the quantization value can be reused may be described in the history information. Otherwise, whether or not the quantization value can be reused may be judged according to a predetermined condition: whether or not the picture frame processed by a past encoding process shown in the history information matches with the picture frame at a re-encoding process both in the position and size; whether or not the bit rate in the past encoding process shown in the history information is lower than the bit rate in the present encoding process; or whether or not the chroma format in the past encoding process is larger than the chroma format in the present encoding process.

If it has been judged that the quantization value can be reused based on the history information, the quantization-value setting unit 177 judges whether or not the quantization value Q included in the history information is larger than a predetermined value.

Figure 6:
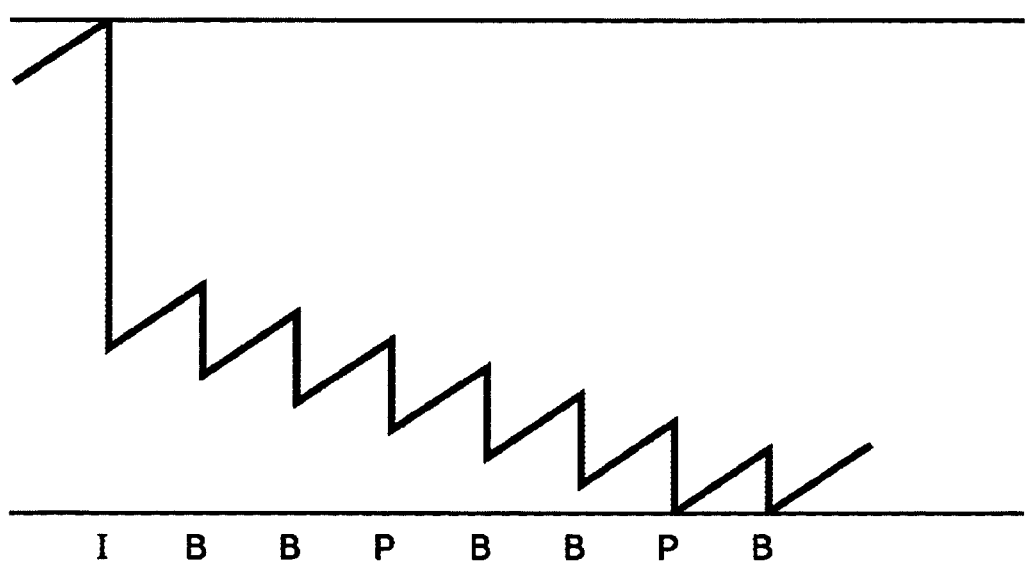
FIG. 6 shows a track of the VBV buffer when a distorted picture is re-encoded by using a quantization value and so on used in a past encoding process.

As described above, when a distorted picture is re-encoded by using a quantization value or the like used in a past encoding process, the amount of generated code is small in a picture which was an I-picture because data mainly composed of high-frequency components has been reduced, as explained with reference to FIG. 6. However, in a picture which was a P-picture or a B-picture, a large amount of code is generated because data including a differential increased by distortion is encoded by using a quantization value which was used when the differential was small. Accordingly, a VBV buffer failure occurs. In order to prevent the VBV buffer failure, the quantization value used for a re-encoding process must be appropriately adjusted.

That is, a macroblock which was encoded with a small quantization value in a past encoding process has a small amount of information. Therefore, in order to prevent an increase in the amount of generated code due to the amount of information increased by distortion caused at a re-encoding process, the quantization value should be adjusted so that it does not become too small.

Therefore, an appropriate minimum quantization value Qmin is set based on a condition such as the bit rate of an intermediate encoding process. When a quantization value Qref included in the history information is smaller than the minimum quantization value Qmin, the quantization value Qref is not reused but the minimum quantization value Qmin is used. Accordingly, the amount of generated code can be minimized.

According to the MPEG standard, the quantization value Q may take on values from 1 to 112 (q_scale_type=1, that is, in a case of nonlinear quantization) or from 2 to 62 (q_scale_type=0, that is, in a case of linear quantization). Generally, an encoder or an encoding unit in a transcoder or the like performs quantization by using any quantization value Q within this range. In other words, an encoder or an encoding unit in a transcoder or the like uses a quantization value Q in the range of 1 to 112 or 2 to 62, or a quantization value Q in a predetermined range narrower than 1 to 112 or 2 to 62.

On the other hand, in the encoding unit 161 of the present invention, when the quantization value Qref used at a past encoding process included in the history information can be reused, a predetermined minimum quantization value Qmin is set. The predetermined minimum quantization value Qmin is larger than a minimum value in the range of the quantization values Q used in normal rate control (of course, the range may be narrower than the range defined by the MPEG standard). In the encoding unit 161, when the quantization value Qref is smaller than the minimum quantization value Qmin, the quantization value Qref is not reused but the minimum quantization value Qmin is used.

For example, all frames are encoded into intraframes in an intermediate encoding process, where the bit rate is 50 Mbps, and an appropriate minimum quantization value Qmin used in the encoding unit 161 is 5. In this case, if the quantization value Qref used in the past encoding process is 2, the quantization-value setting unit 177 does not reuse the quantization value Qref=2 included in the history information but uses the minimum quantization value Qmin=5.

The minimum quantization value Qmin is appropriately adjusted according to conditions. For example, all frames are encoded into intraframes in an intermediate encoding process, where the bit rate is 30 Mbps. In this case, more distortion is generated than in a case where all the frames are encoded into intraframes with a bit rate of 50 Mbps. Therefore, the minimum quantization value Qmin is adjusted to a value larger than 5, which is appropriate when the bit rate is 50 Mbps, for example, Qmin is set at 7.

In a case where the quantization-value setting unit 177 does not set a quantization step size based on the history information, when the amount of actually-generated code of macroblock is larger than a desired amount, the quantization-value setting unit 177 sets a large quantization step size in order to reduce the amount of generated code. On the other hand, when the amount of actually-generated code is smaller than the desired amount, the quantization-value setting unit 177 sets a small quantization step size in order to increase the amount of generated code.

That is, the quantization-value setting unit 177 estimates change in the accumulation status of the VLC data stored in the VBV buffer, which is provided in the decoder side. Accordingly, the quantization-value setting unit 177 obtains an occupancy rate in a virtual buffer so as to calculate a quantization value Q, and supplies the quantization value Q to the quantization unit 176.

A buffer occupancy rate d(j) of a virtual buffer in a j-th macroblock is represented by the following Equation (1), a buffer occupancy rate d(j+1) of a virtual buffer in a j+1-th macroblock is represented by the following Equation (2), and, by subtracting Equation (2) from Equation (1), the buffer occupancy rate d(j+1) of the virtual buffer in the j+1-th macroblock is represented as the following Equation (3).

$$d(j)=d(0)+B(j-1)-\{Tx(j-1)/MBcnt\} \quad (1)$$

Herein, d(0) is an initial buffer capacity, B(j) is the number of bits generated by encoding in the j-th macroblock, MBcnt is the number of macroblocks in a picture, and T is a desired amount of generated code in each picture.

$$d(j+1)=d(0)+B(j)-(Txj)/MBcnt \quad (2)$$

$$d(j+1)=d(j)+\{B(j)-B(j-1)\}-T/MBcnt \quad (3)$$

For example, when the macroblocks in a picture includes an intra-slice portion and an inter-slice portion, the quantization-value setting unit 177 can set a desired amount of generated code Tpi and Tpp, which are assigned to each macroblock in the intra-slice portion and each macroblock in the inter-slice portion, respectively.

Accordingly, the quantization-value setting unit 177 substitutes the buffer occupancy rate d(j+1) and a constant r shown in Equation (4) into Equation (5) so as to calculate quantization index data Q(j+1) of the macroblock (j+1), and supplies the calculation result to the quantization unit 176.

$$r=(2 \times br)/pr \quad (4)$$

$$Q(j+1)=d(j+1)\times(31/r) \quad (5)$$

Herein, br is a bit rate and pr is a picture rate.

The quantization unit 176 sets a quantization step size in the subsequent macroblock based on the quantization value Q supplied from the quantization-value setting unit 177, and quantizes the DCT coefficient data by using the quantization step size.

Accordingly, the quantization unit 176 can quantize the DCT coefficient data by using a quantization step size which is the most suitable for the desired amount of generated code of the subsequent picture, the step size having been calculated based on the amount of actually-generated code.

The quantization unit 176 can perform quantization so as to prevent overflow/underflow of the buffer 184 in accordance with the data occupancy rate in the buffer 184. Also, the quantization unit 176 can generate quantized DCT coefficient data so that overflow/underflow of the VBV buffer in the decoder side does not occur.

In the above-described embodiment, the encoding process is performed in units of pictures. Basically, the encoding process is performed in the same way as described above when the encoding process is performed in units of slices or macroblocks.

Figure 4:
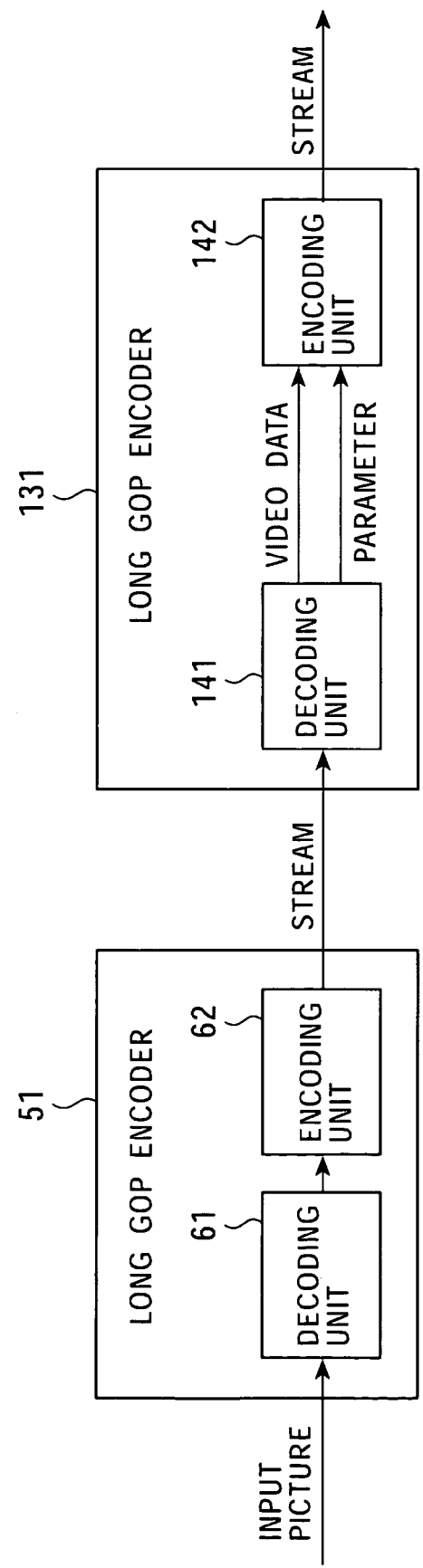
FIG. 4 shows a known system for performing re-encoding by changing the bit rate of an MPEG long GOP in which encoding history information is used.
Figure 5:
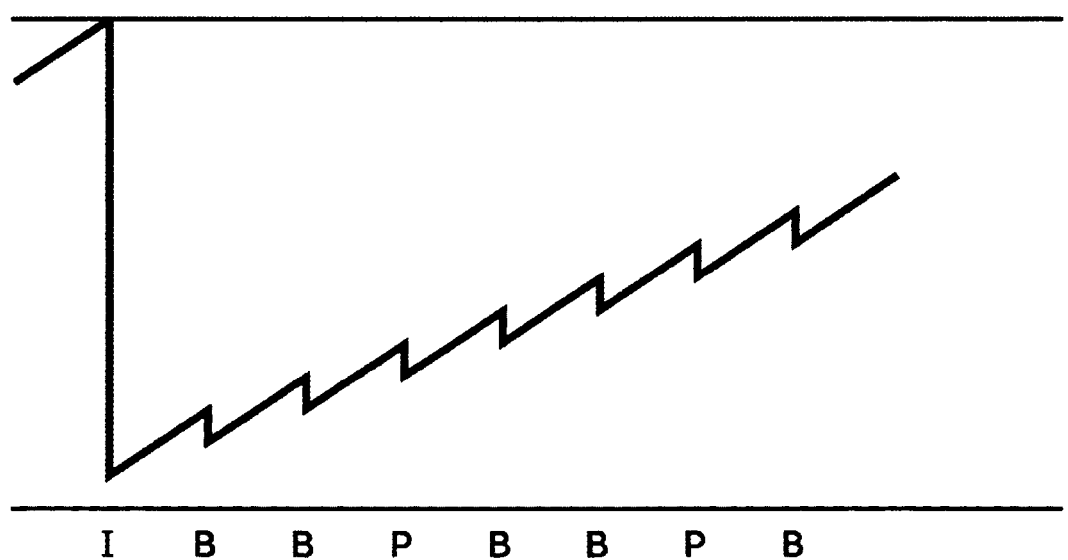
FIG. 5 shows a track of a VBV buffer when an SDI static picture is encoded into an MPEG long GOP.
Figure 9:
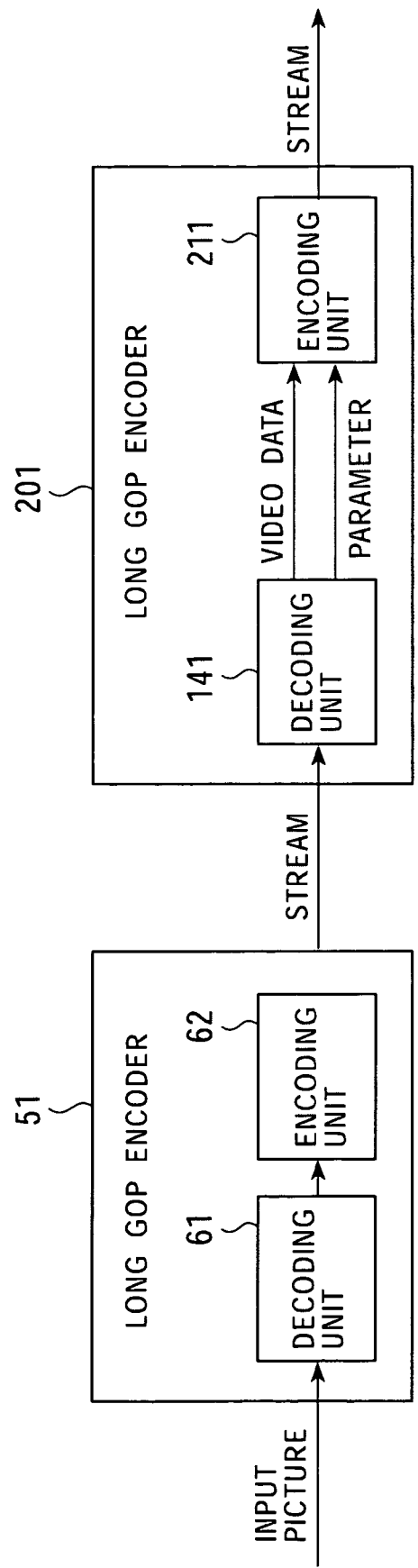
FIG. 9 is a block diagram showing the configuration of a system of the present invention for performing re-encoding by changing the bit rate of an MPEG long GOP.

The present invention can also be applied to the system described with reference to FIG. 4, in which an input picture is encoded into an MPEG long GOP at a high bit rate, is decoded, and is then re-encoded into a low-bit-rate long GOP, where picture deterioration is not caused by re-encoding. FIG. 9 is a block diagram showing the configuration of a system of the present invention for encoding an input picture into an MPEG long GOP at a high bit rate, decoding it, and then re-encoding it into a low-bit-rate long GOP. In this system, a VBV buffer failure is prevented and the picture quality is not deteriorated by a re-encoding process. In FIG. 9, parts corresponding to those in FIG. 4 are denoted by the same reference numerals, and the corresponding description will be omitted.

The system shown in FIG. 9 includes a long GOP encoder 201 instead of the long GOP encoder 131. The long GOP encoder 201 has basically the same configuration as that of the long GOP encoder 131, except that an encoding unit 211, which can set a predetermined minimum value for a value to be set as the quantization value, is provided instead of the encoding unit 142.

The long GOP encoder 201 receives MPEG long GOP stream (ASI stream) data, which has been encoded by the long GOP encoder 51, and decodes the high-bit-rate MPEG long GOP by the decoding unit 141. At this time, the long GOP encoder 201 obtains necessary encoding parameters and supplies the decoded video data and the obtained encoding parameters to the encoding unit 211. The encoding unit 211 encodes the video data into a low-bit-rate MPEG long GOP by using the supplied encoding parameters as necessary, and outputs the encoded low-bit-rate MPEG long GOP stream (ASI stream) data.

Figure 10:
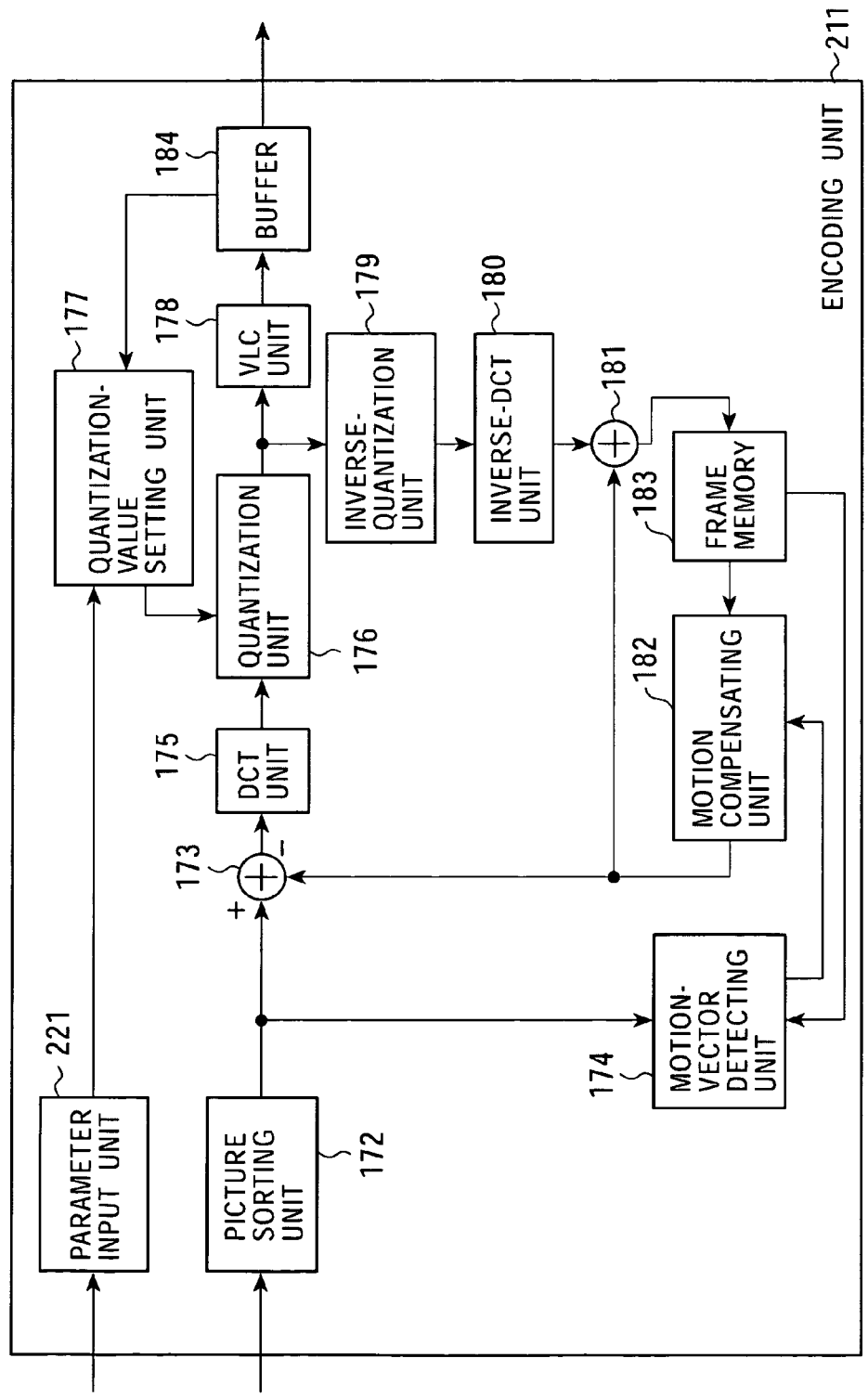
FIG. 10 is a block diagram showing the configuration of an encoding unit shown in FIG. 9.

FIG. 10 is a block diagram showing the configuration of the encoding unit 211. In FIG. 10, parts corresponding to those of the encoding unit 161 shown in FIG. 8 are denoted by the same reference numerals, and the corresponding description will be omitted.

The encoding unit 211 has basically the same configuration as that of the encoding unit 161 shown in FIG. 8, except that the history extracting unit 171 is not provided and that a parameter input unit 221 is provided. The parameter input unit 221 obtains the parameters supplied from the decoding unit 141 and supplies them to the quantization-value setting unit 177.

The quantization-value setting unit 177 continuously monitors the accumulation status of the VLC data stored in the buffer 184, and sets a quantization step size based on occupancy-rate information representing the accumulation status or on the parameter information supplied from the parameter input unit 221.

The quantization-value setting unit 177 judges whether or not an encoding process can be performed by using the parameter information based on a signal indicating a user's operation input supplied from an operation input unit (not shown) or on whether or not the parameter information has been supplied from the parameter input unit 221. As the above-described history information, the parameter information supplied from the parameter input unit 221 includes a picture type, a quantization value, a motion vector, and a quantization matrix.

If the quantization-value setting unit 177 has judged that encoding can be performed by using the parameter information, the quantization-value setting unit 177 judges whether or not a quantization value can be reused based on the parameter information supplied from the parameter input unit 221.

Whether or not the quantization value can be reused may be set in advance by the user. Alternatively, information indicating whether or not the quantization value can be reused may be described in the parameter information. Otherwise, whether or not the quantization value can be reused may be judged according to a predetermined condition: whether or not the picture frame processed by a past encoding process shown in the parameter information matches with the picture frame at a re-encoding process both in the position and size; whether or not the bit rate in the past encoding process shown in the parameter information is lower than the bit rate in the present encoding process; or whether or not the chroma format in the past encoding process is larger than the chroma format in the present encoding process.

If it has been judged that the quantization value can be reused based on the parameter information, the quantization-value setting unit 177 judges whether or not the quantization value Q included in the parameter information is larger than a predetermined value.

An appropriate value based on a condition such as the bit rate of the intermediate encoding process is set as the minimum quantization value Qmin. When the quantization value Qref included in the parameter information is smaller than the minimum quantization value Qmin, the quantization-value setting unit 177 does not reuse the quantization value Qref but uses the minimum quantization value Qmin, so that the amount of generated code can be suppressed.

Figure 11:
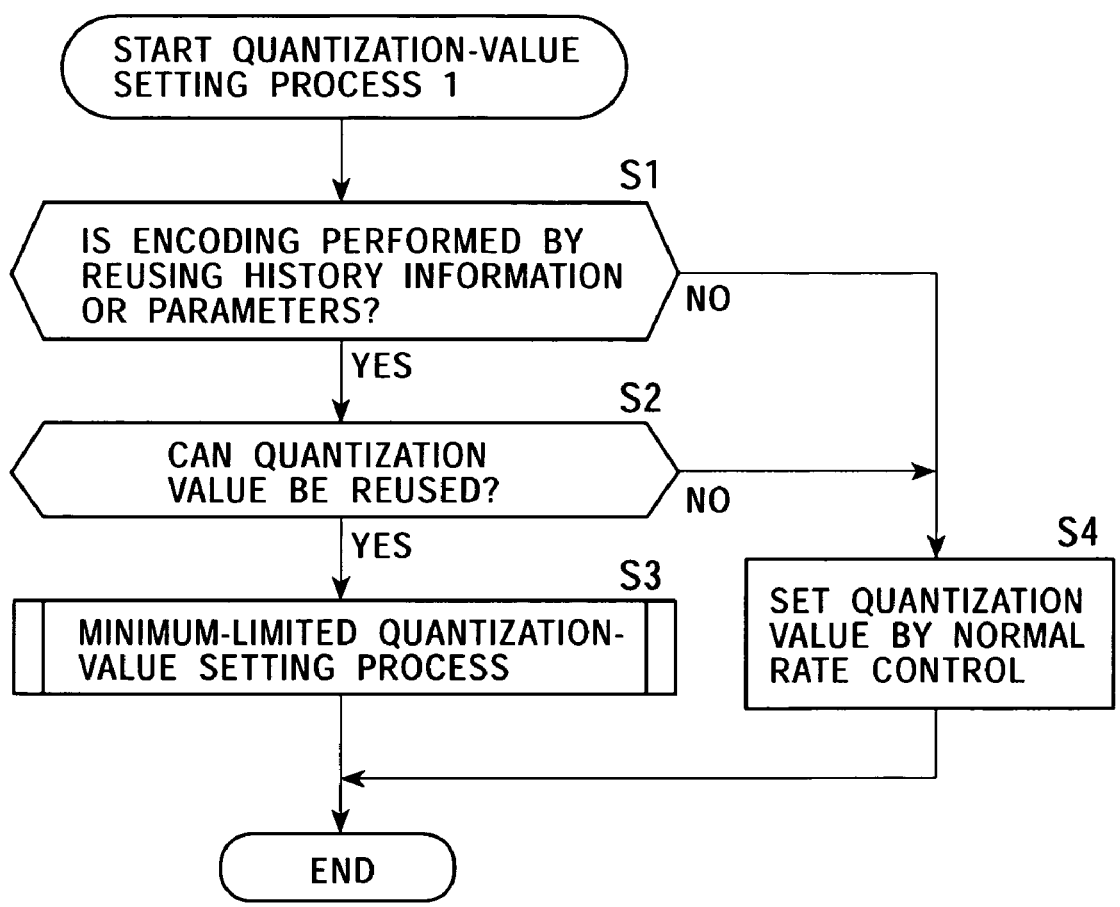
FIG. 11 is a flowchart showing a quantization-value setting process 1.

Next, a quantization-value setting process 1, which is performed by the encoding unit 161 shown in FIG. 8 or by the encoding unit 211 shown in FIG. 10, will be described with reference to the flowchart shown in FIG. 11.

In step S1, the quantization-value setting unit 177 judges whether or not an encoding process is to be performed by using the history information or parameters, based on a signal indicating a user's operation input supplied from an operation input unit (not shown) or based on whether or not the quantization-value setting unit 177 has received the history information from the history information extracting unit 171 or the parameter information from the parameter input unit 221.

If it has been judged that an encoding process is to be performed by reusing the history information or the parameter information in step S1, the process proceeds to step S2, where the quantization-value setting unit 177 judges whether or not a quantization value can be reused based on whether or not a predetermined condition is satisfied, for example, whether or not a setting has been done in advance so that the quantization value cannot be reused; whether or not the history information includes a description indicating that the quantization value can be reused; whether or not the picture frame processed by a past encoding process shown in the history information or the parameter information matches with the picture frame at a re-encoding process both in the position and size; whether or not the bit rate in the past encoding process shown in the history information or the parameter information is lower than the bit rate in the present encoding process; or whether or not the chroma format in the past encoding process is larger than the chroma format in the present encoding process.

Figure 12:
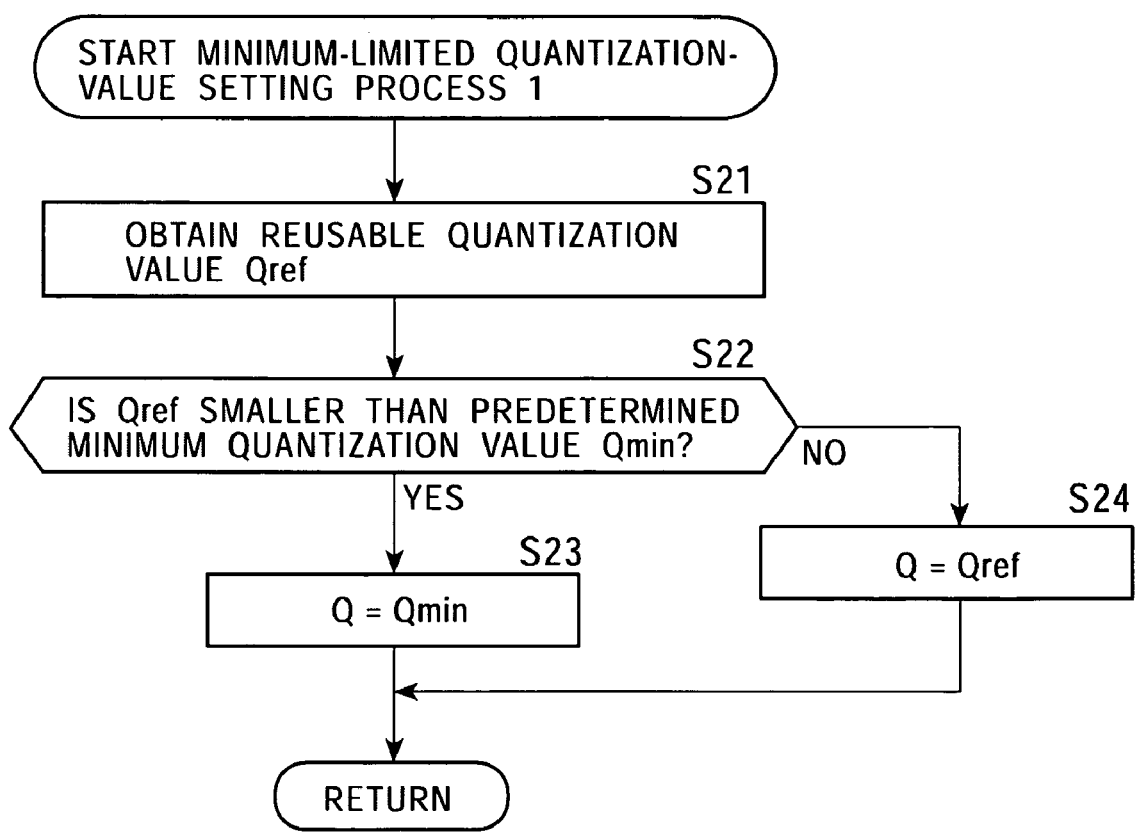
FIG. 12 is a flowchart showing a minimum-limited quantization-value setting process 1.

If it has been judged that the quantization value can be reused in step S2, the process proceeds to step S3, where a minimum-limited quantization-value setting process, which will be described later with reference to FIG. 12, is performed. Then, the process is completed.

If it has been judged that an encoding process is not to be performed by reusing the history information or the parameter information in step S1, or if it has been judged that the quantization value cannot be reused in step S2, the process proceeds to step S4, where the quantization-value setting unit 177 performs an operating process, which has been explained by using Equations (1) to (5). Accordingly, the quantization-value setting unit 177 sets the quantization value by a normal rate control, and then the process is completed.

By performing the above-described process, it is judged whether or not a quantization value can be reused. Then, if it has been judged that the quantization value can be reused, the minimum-limited quantization-value setting process is performed.

Next, the minimum-limited quantization-value setting process 1 will be described with reference to the flowchart shown in FIG. 12. The process is performed in step S3 in FIG. 11.

In step S21, the quantization-value setting unit 177 obtains a reusable quantization value Qref, which is included in the history information supplied from the history extracting unit 171 or in the parameter information supplied from the parameter input unit 221.

In step S22, the quantization-value setting unit 177 judges whether or not the quantization value Qref obtained in step S21 is smaller than a predetermined minimum quantization value Qmin.

If it has been judged that the quantization value Qref is smaller than the predetermined minimum quantization value Qmin in step S22, the process proceeds to step S23, where the quantization-value setting unit 177 sets the quantization value Q at Qmin, so that the process is completed.

If it has been judged that the quantization value Qref is not smaller than, that is, larger than the predetermined minimum quantization value Qmin in step S22, the process proceeds to step S24, where the quantization-value setting unit 177 reuses the quantization value Qref, which is included in the history information supplied from the history extracting unit 171 or in the parameter information supplied from the parameter input unit 221, so that the quantization value Q is set at Qref. Then, the process is completed.

By performing the process shown in FIG. 12, the quantization value Q can be controlled so that it is not below a predetermined value. Accordingly, a VBV buffer failure, which occurs when data including a differential increased by distortion is quantized by using a too small quantization value, can be prevented.

In the process shown in FIG. 12, the quantization value Q is controlled so that it is not below the minimum value Qmin by using the predetermined minimum quantization value Qmin. Alternatively, when the bit rate of the immediately preceding encoding can be detected, the quantization value Q can be controlled so that it is not below the predetermined value in another way. That is, a plurality of minimum quantization values Qmin corresponding to the bit rate are prepared, and an optimum minimum quantization value Qmin is selected according to the detected bit rate of the immediately preceding encoding.

Figure 13:
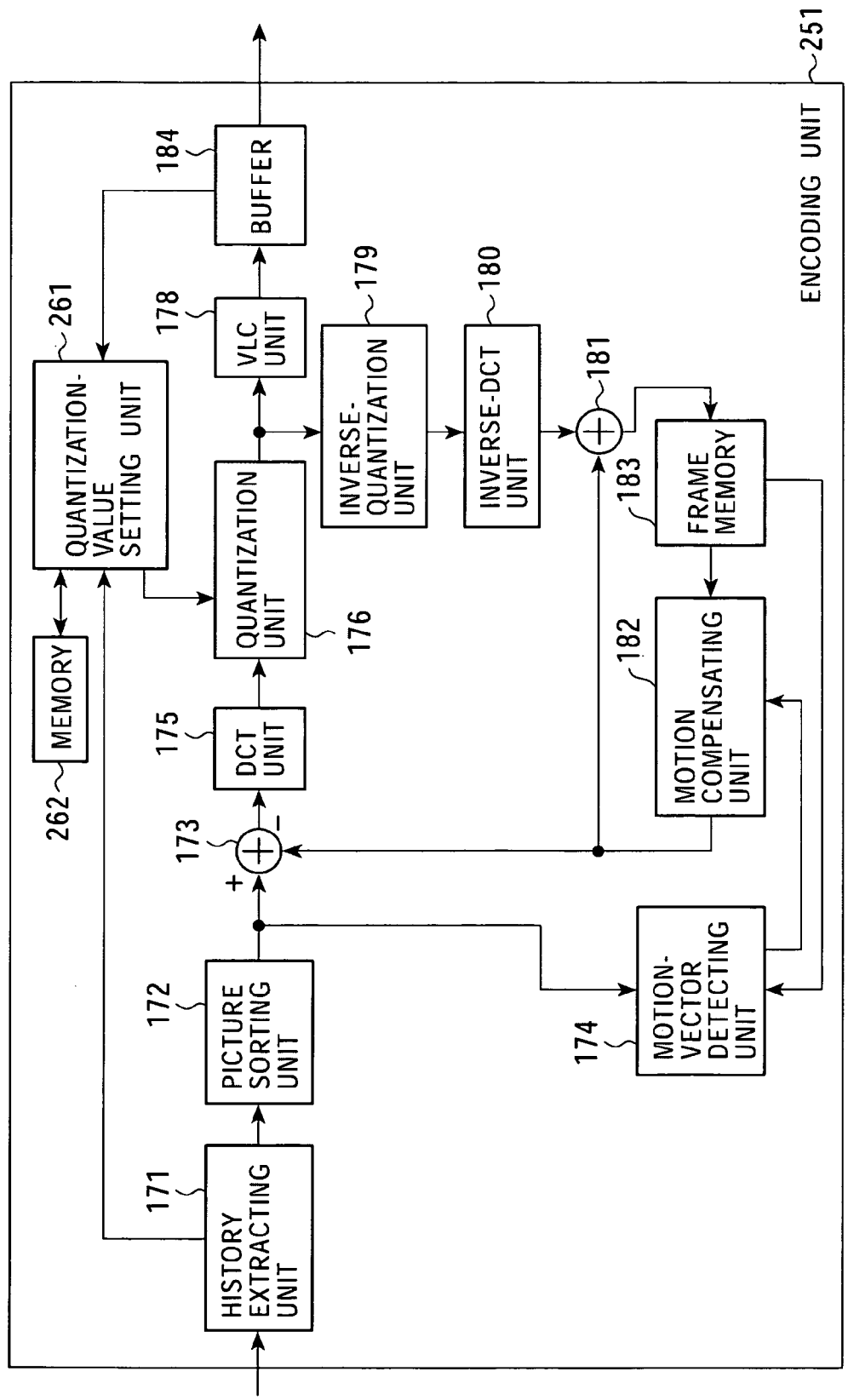
FIG. 13 is a block diagram showing the configuration of an encoding unit including a memory shown in FIG. 7.
Figure 14:
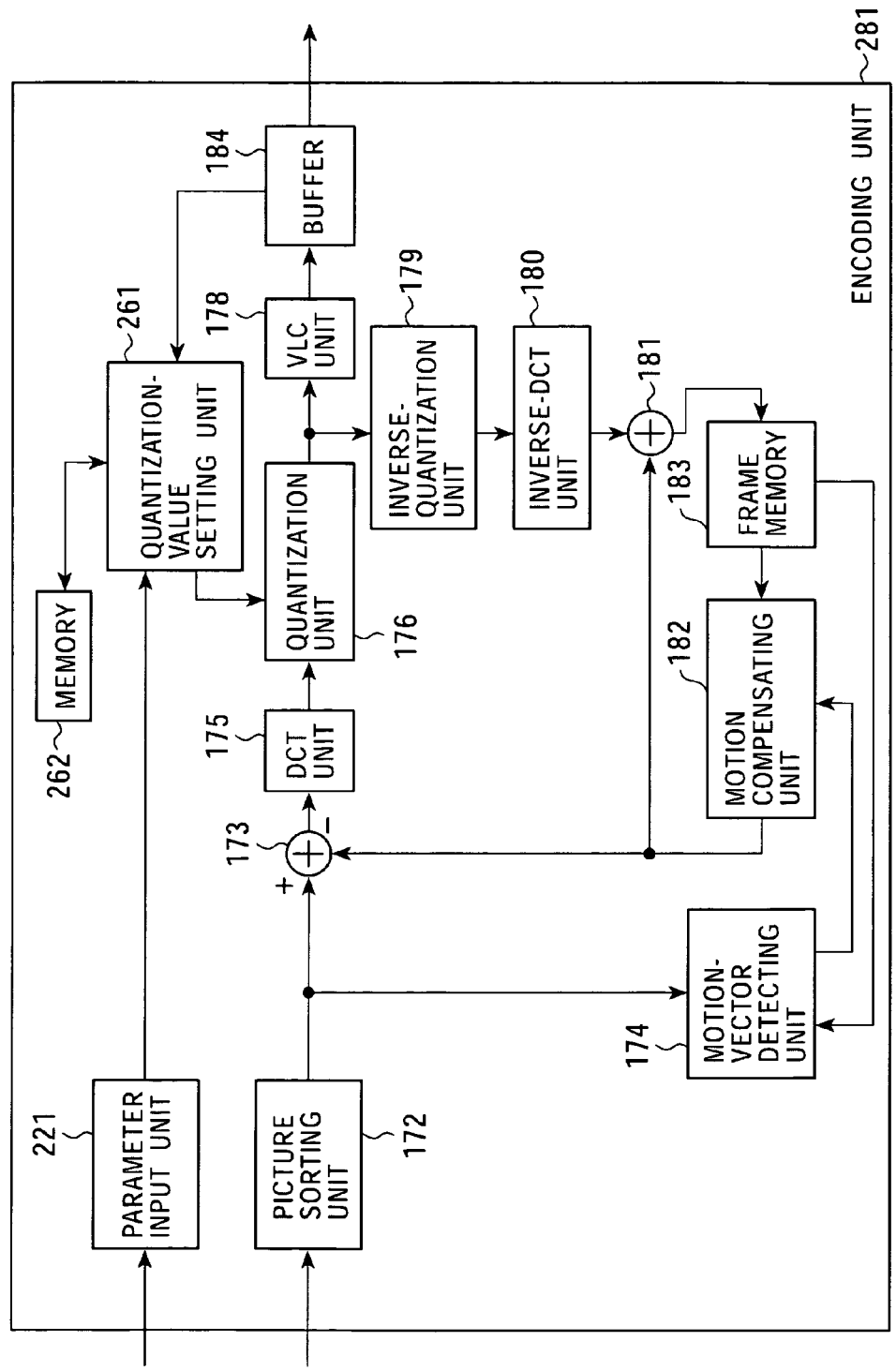
FIG. 14 is a block diagram showing the configuration of an encoding unit including a memory shown in FIG. 9.

FIGS. 13 and 14 are block diagrams showing the configurations of encoding units 251 and 281, respectively. In the encoding units 251 and 281, a plurality of minimum quantization values Qmin are prepared, and an optimum minimum quantization value Qmin can be selected according to the bit rate of the immediately preceding encoding.

The encoding unit 161 in the SDTI CP-ASI converter 151 shown in FIG. 7 is replaced by the encoding unit 251 shown in FIG. 13, and the encoding unit 211 in the long GOP encoder 201 shown in FIG. 9 is replaced by the encoding unit 281 shown in FIG. 14. With this configuration, an optimum minimum quantization value Qmin can be selected from among a plurality of values according to the bit rate of the immediately preceding encoding.

In FIG. 13, parts corresponding to those of the encoding unit 161 shown in FIG. 8 are denoted by the same reference numerals, and the corresponding description will be omitted. Also, in FIG. 14, parts corresponding to those of the encoding unit 211 shown in FIG. 10 are denoted by the same reference numerals, and the corresponding description will be omitted. That is, the encoding unit 251 shown in FIG. 13 has basically the same configuration as that of the encoding unit 161 shown in FIG. 8, except that a quantization-value setting unit 261 is provided instead of the quantization-value setting unit 177 and that a memory 262 is newly added. Also, the encoding unit 281 shown in FIG. 14 has basically the same configuration as that of the encoding unit 211 shown in FIG. 10, except that the quantization-value setting unit 261 is provided instead of the quantization-value setting unit 177 and that the memory 262 is newly added.

The memory 262 stores a plurality of minimum quantization values Qmin, which are associated with the bit rate of the immediately preceding encoding. When the quantization-value setting unit 261 can detect the bit rate of the immediately preceding encoding from the supplied history information or the parameter information, or when the quantization-value setting unit 261 recognizes the bit rate of the immediately preceding encoding, the quantization-value setting unit 261 selects and reads a minimum quantization value Qmin corresponding to the bit rate of the immediately preceding encoding by referring to the memory 262.

Then, the quantization-value setting unit 261 compares the reusable quantization value Qref, which is included in the history information supplied from the history extracting unit 171 or in the parameter information supplied from the parameter input unit 221, with the selected minimum quantization value Qmin corresponding to the bit rate of the immediately preceding encoding, and supplies the larger value of them to the quantization unit 176. When the quantization-value setting unit 261 cannot detect the bit rate of the immediately preceding encoding, it compares the predetermined minimum quantization value Qmin with the quantization value Qref and supplies the larger value of them to the quantization unit 176, as in the case described with reference to FIG. 12.

The encoding unit 251 shown in FIG. 13 and the encoding unit 281 shown in FIG. 14 can perform the quantization-value setting process 1, which has been described with reference to the flowchart shown in FIG. 11. Further, in step S3 in FIG. 11, a minimum-limited quantization-value setting process 2 shown in the flowchart in FIG. 15 may be performed instead of the minimum-limited quantization-value setting process 1, which has been described with reference to the flowchart shown in FIG. 12.

Now, the minimum-limited quantization-value setting process 2, which is performed in step S3 of the quantization-value setting process 1 shown in FIG. 11 by the encoding unit 251 shown in FIG. 13 or the encoding unit 281 shown in FIG. 14, will be described with reference to the flowchart shown in FIG. 15.

In step S41, the quantization-value setting unit 261 obtains a reusable quantization value Qref, which is included in the history information supplied from the history extracting unit 171 or in the parameter information supplied from the parameter input unit 221.

In step S42, the quantization-value setting unit 261 judges whether or not the bit rate of the immediately preceding encoding has been known or can be detected.

If it has been judged that the bit rate of the immediately preceding encoding has been known or can be detected in step S42, the process proceeds to step S43, where the quantization-value setting unit 261 detects the bit rate of the immediately preceding encoding and refers to the memory 262, and then selects a quantization value corresponding to the detected bit rate so as to set the selected quantization value as a minimum quantization value Qmin.

If it has been judged that the bit rate of the immediately preceding encoding has not been known and cannot be detected in step S42, the process proceeds to step S44, where the quantization-value setting unit 261 sets the minimum quantization value Qmin at a predetermined value, which has been appropriately determined based on a condition such as the bit rate of the intermediate encoding process.

After step S43 or S44, the process proceeds to step S45, where the quantization-value setting unit 261 judges whether or not the quantization value Qref obtained in step S41 is smaller than the minimum quantization value Qmin corresponding to the bit rate set in step S43 or the predetermined minimum quantization value Qmin set in step S44.

If it has been judged that the quantization value Qref is smaller than the set minimum quantization value Qmin in step S45, the process proceeds to step S46, where the quantization-value setting unit 261 sets the quantization value Q at Qmin, and then the process is completed.

If it has been judged that the quantization value Qref is not smaller than, that is, larger than the set minimum quantization value Qmin in step S45, the process proceeds to step S47, where the quantization-value setting unit 261 reuses the quantization value Qref, which is included in the history information supplied from the history extracting unit 171 or in the parameter information supplied from the parameter input unit 221, so that the quantization value Q is set at Qref. Then, the process is completed.

By performing the process shown in FIG. 15, the quantization value Q can be controlled so that it is not below a quantization value which is selected according to the immediately preceding frame rate. Accordingly, a VBV buffer failure, which occurs when data including a differential increased by distortion is quantized by using a too small quantization value, can be prevented. Also, too significant deterioration in the picture quality can be prevented.

Figure 15:
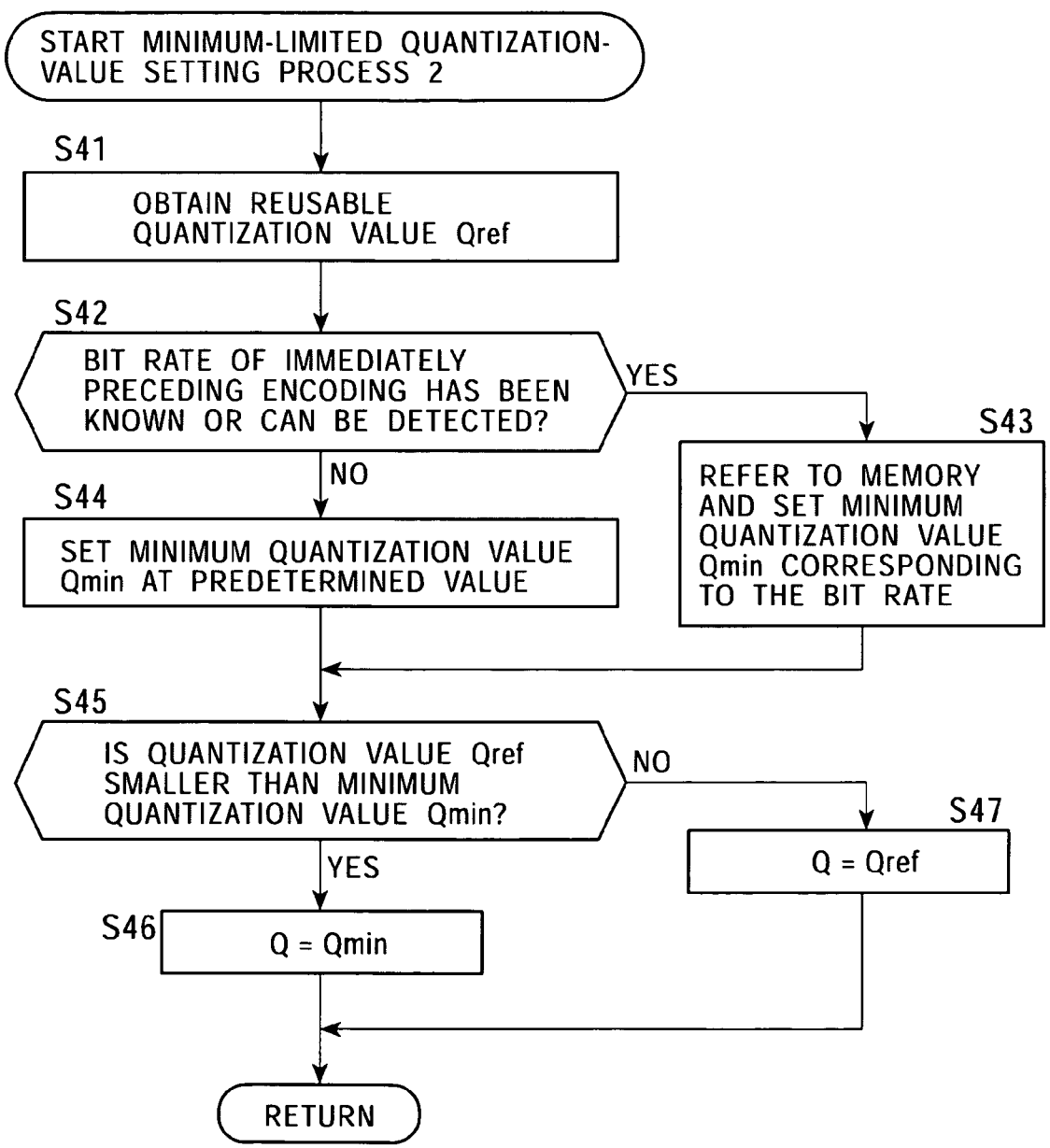
FIG. 15 is a flowchart showing a minimum-limited quantization-value setting process 2.

The processes described with reference to FIGS. 12 and 15 are performed in order to prevent an increase in the amount of generated code due to a too small quantization value Q, so as to prevent a VBV buffer failure. That is, when the minimum-limited quantization-value setting process 1 shown in FIG. 12 or the minimum-limited quantization-value setting process 2 shown in FIG. 15 is performed, the amount of generated code decreases, and thus the picture quality deteriorates.

For example, when distortion is generated in a picture which was a P-picture or a B-picture, the distortion causes an increase in a differential. Then, the P-picture or the B-picture, including an increased differential, is re-encoded by using a quantization value which was used when the differential was small. Accordingly, a large amount of code is generated and a VBV buffer failure is caused. However, as described above with reference to FIG. 6, in a picture which was an I-picture, the amount of generated code is small because data mainly composed of high-frequency components has been reduced. That is, when a picture to be encoded is an I-picture, the amount of generated code is small even if the quantization value Q is not set at a small value. Accordingly, a VBV buffer failure does not occur.

Also, when an encoding process is performed in a predictive coding mode in units of slices or macroblocks, not in units of pictures, the amount of generated code is small also in an intra-slice or an intra-macroblock. Therefore, even if the quantization value Q is not set at a small value, a VBV buffer failure does not occur.

Accordingly, by applying the minimum-limited quantization-value setting process 1 or 2, which has been described with reference to FIG. 12 or 15, to a part except an I-picture, an intra-slice, and an intra-macroblock, a VBV buffer failure can be prevented and deterioration in the picture quality can be prevented.

Figure 16:
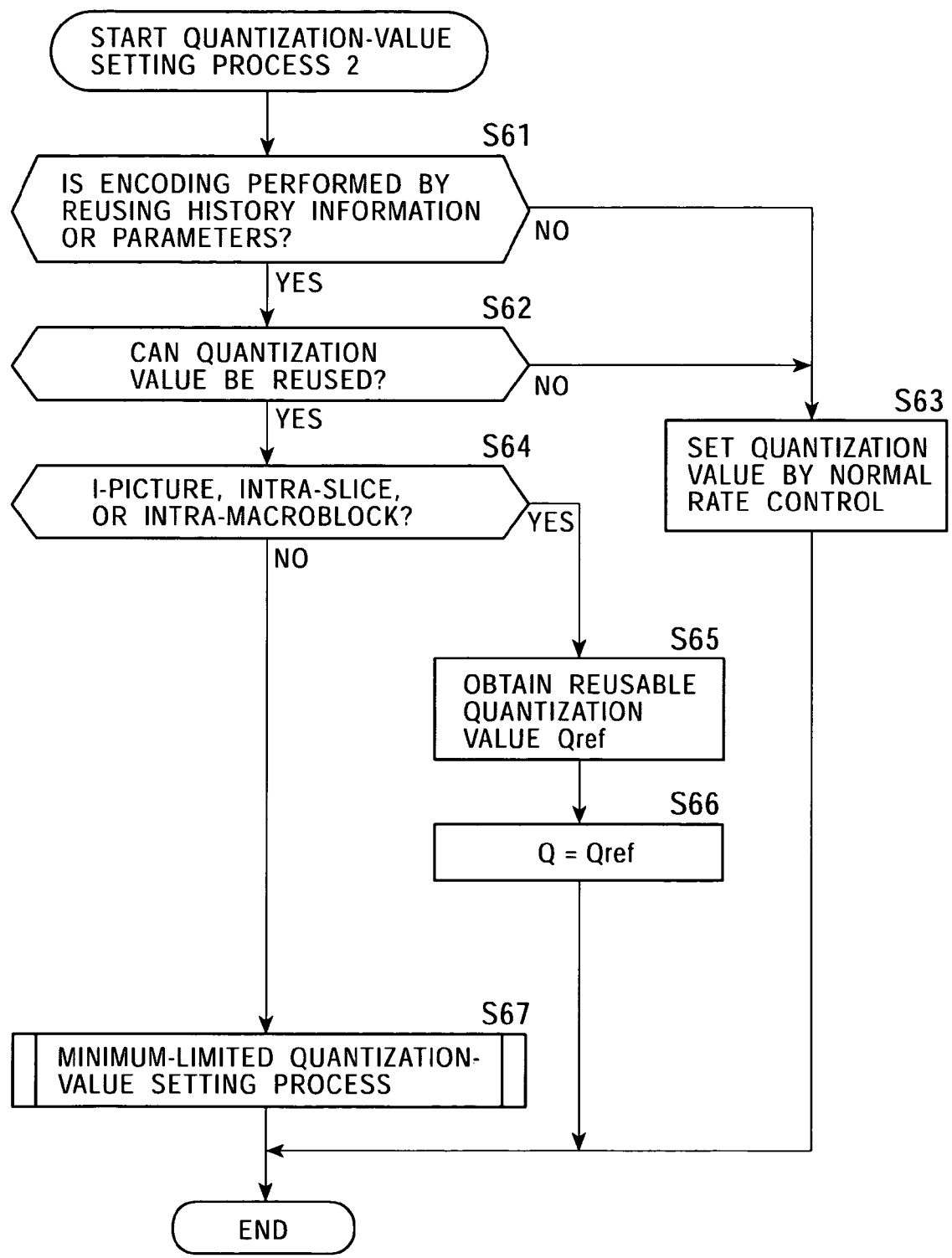
FIG. 16 is a flowchart showing a quantization-value setting process 2.

Next, a quantization-value setting process 2, which is performed by the encoding unit 161 in FIG. 8, the encoding unit 211 in FIG. 10, the encoding unit 251 in FIG. 13, or the encoding unit 281 in FIG. 14, will be described with reference to the flowchart shown in FIG. 16. In this process, the quantization value Q is not set at a smaller value in an I-picture, an intra-slice, or an intra-macroblock.

In step S61, the quantization-value setting unit 177 or 261 judges whether or not an encoding process is to be performed by reusing the history information or the parameter information, based on a signal indicating a user's operation input supplied from an operation input unit (not shown) or based on whether or not the history information is supplied from the history extracting unit 171 or the parameter information is supplied from the parameter input unit 221.

If it has been judged that an encoding process is to be performed by reusing the history information or the parameter information in step S61, the process proceeds to step S62, where the quantization-value setting unit 177 or 261 judges whether or not a quantization value can be reused based on whether or not a predetermined condition has been satisfied, for example, whether or not a setting has been done in advance so that the quantization value cannot be reused; whether or not the history information includes a description indicating that the quantization value can be reused; whether or not the picture frame processed by a past encoding process shown in the history information or the parameter information matches with the picture frame at a re-encoding process both in the position and size; whether or not the bit rate in the past encoding process shown in the history information or the parameter information is lower than the bit rate in the present encoding process; or whether or not the chroma format in the past encoding process is larger than the chroma format in the present encoding process.

If it has been judged that an encoding process is not to be performed by reusing the history information or the parameter information in step S61, or if it has been judged that a quantization value cannot be reused in step S62, the process proceeds to step S63, where the quantization-value setting unit 177 or 261 performs an operation process which has been described by using Equations (1) to (5) so as to set the quantization value by normal rate control, and then the process is completed.

If it has been judged that a quantization value can be reused in step S62, the process proceeds to step S64, where the quantization-value setting unit 177 or 261 judges whether the data to be encoded is any of an I-picture, an intra-slice, and an intra-macroblock.

If it has been judged that the data to be encoded is one of an I-picture, an intra-slice, and an intra-macroblock in step S64, the process proceeds to step S65, where the quantization-value setting unit 177 or 261 obtains a reusable quantization value Qref, which is included in the history information supplied from the history extracting unit 171 or in the parameter information supplied from the parameter input unit 221.

In step S66, the quantization-value setting unit 177 or 261 reuses the quantization value Qref, which is included in the history information supplied from the history extracting unit 171 or in the parameter information supplied from the parameter input unit 221, so that the quantization value Q is set at Qref. Then, the process is completed.

If it has been judged that the data to be encoded is not any of an I-picture, an intra-slice, and an intra-macroblock in step S64, the process proceeds to step S67, where the minimum-limited quantization-value setting process shown in FIG. 12 or 15 is performed. Then, the process is completed.

By performing this process, deterioration in the picture quality can be prevented in an I-picture, an intra-slice, or an intra-macroblock. Further, a quantization value Q which can be used for quantizing a B-picture, a P-picture, an inter-slice, or an inter-macroblock can be controlled so that it is not below a predetermined value. Accordingly, a VBV buffer failure can be prevented.

The present invention can also be applied to a case where low-delay encoding is performed. In the low-delay encoding, a B-picture causing a reordering delay and an I-picture generating a large amount of code are not used but only a P-picture is used. By dividing the P-picture into intra-slices composed of some slices and inter-slices composed of the other slices, encoding can be performed without reordering. Also, the present invention can be applied to the following case. That is, it is specified that each of 15 frames should be processed as which of three picture type: intraframe-coding picture data (I-picture), interframe forward predictive coding picture data (P-picture), or bidirectional predictive coding picture data (B-picture). Then, each frame picture is encoded according to the specified frame picture type (I-picture, P-picture, or B-picture).

Further, the present invention can be applied to the following case. That is, all frame pictures are regarded as P-pictures in low-delay coding. For example, in a frame having a width of 45 macroblocks and a height of 24 macroblocks, an area consisting of the 45 macroblocks (width) and the upper two macroblocks (height) is set as an intra-slice portion, and the remaining area is set as an inter-slice portion. The size of each area may be changed, for example, an area consisting of the 45 macroblocks (width) and the upper one macroblock (height) may be set as an intra-slice portion.

In the above-described embodiment, the present invention is applied to the encoding unit 161, 211, 251, or 281 for performing compression and encoding in the MEPG method. However, the present invention is not limited to this method, but may be applied to an encoder using another picture-compressing method.

In the above-described embodiment, each converter and long GOP encoder for converting stream data includes a decoding unit and an encoding unit. However, the present invention can be applied when the decoding unit and the encoding unit function as independent decoder and encoder, respectively.

Figure 17:
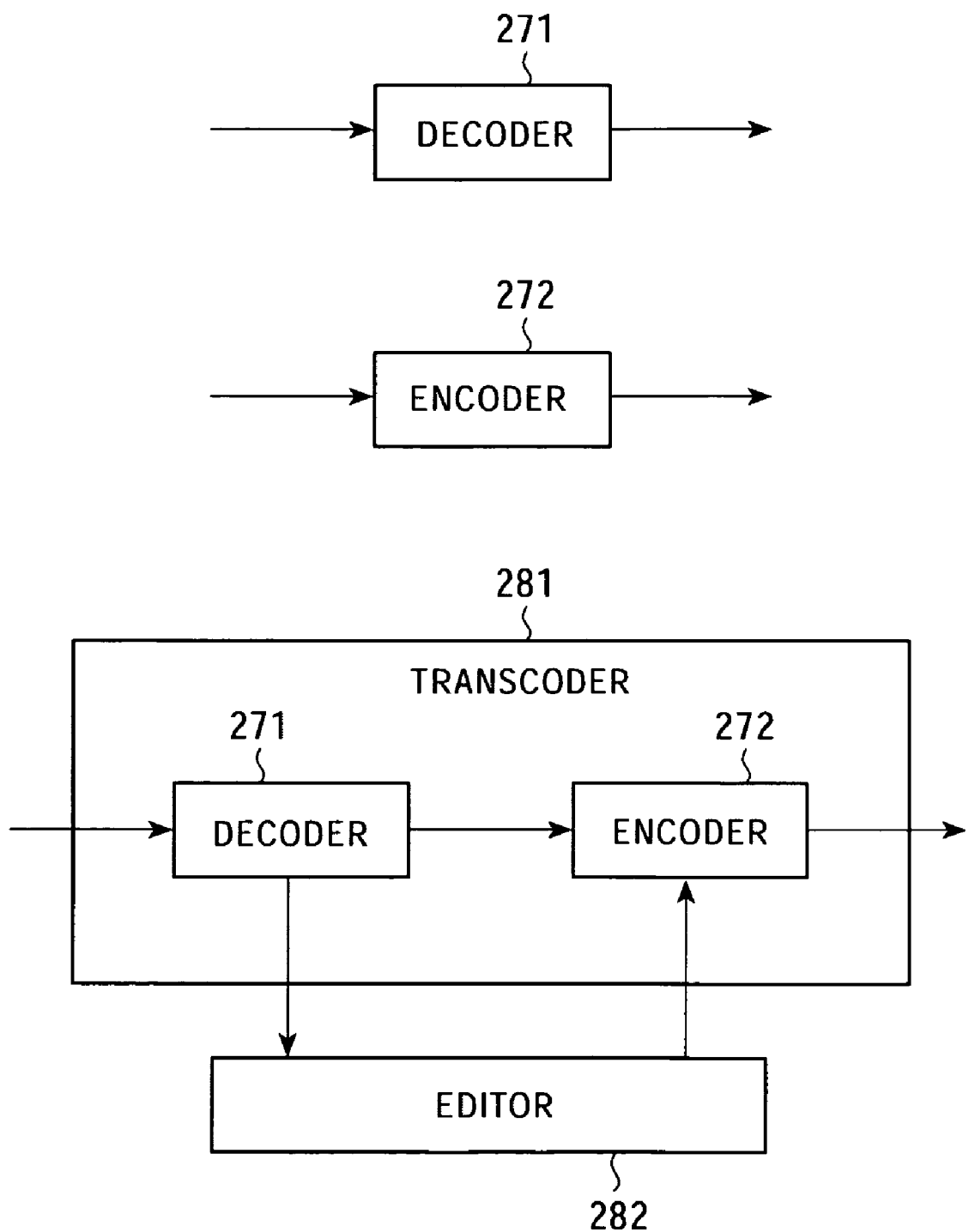
FIG. 17 shows the configuration of another apparatus to which the present invention can be applied.

In the above-described embodiment, each converter and long GOP encoder converts stream data. Alternatively, as shown in FIG. 17, a decoder 271 for decoding stream data into a base-band signal and an encoder 272 for encoding the base-band signal into stream data may be provided as an independent apparatus. Further, the present invention can be applied to a case where the decoder 271 does not completely decode supplied stream data and the corresponding encoder 272 partially encodes the corresponding part of the incompletely-decoded data.

For example, when the decoder 271 performs only decoding and inverse-quantization on a VLC and does not perform an inverse-DCT process, the encoder 272 performs quantization and variable length coding, but does not perform a DCT process. In the encoder 272 for performing such partial encoding (encoding from a mid-stage), the present invention can be of course applied to a judgment for judging whether or not a quantization value is to be reused in quantization.

Further, the present invention can be applied to a case where the encoder 272 encodes a base-band signal which has been completely decoded by the decoder 271 to a mid-stage (for example, a DCT process and quantization are performed but a VLC process is not performed), and a case where data which has been encoded only to a mid-stage because the data has not been completely decoded by the decoder 271 (for example, decoding and inverse-quantization for VLC are performed but inverse-DCT process is not performed) is further encoded to a mid-stage by the encoder 272 (for example, quantization is performed but a VLC process is not performed).

Further, the present invention can be applied to a transcoder 281 including the decoder 271 for performing the partial decoding and the encoder 272 for performing the partial encoding. The transcoder 281 is used, for example, when an editor 282 for performing edit, such as splicing, is used.

The above-described series of processes may be executed by any of hardware and software. In this case, each of the SDTI CP-ASI converter 151 and the long GOP encoder 201 is formed by a personal computer 301 shown in FIG. 18.

Figure 18:
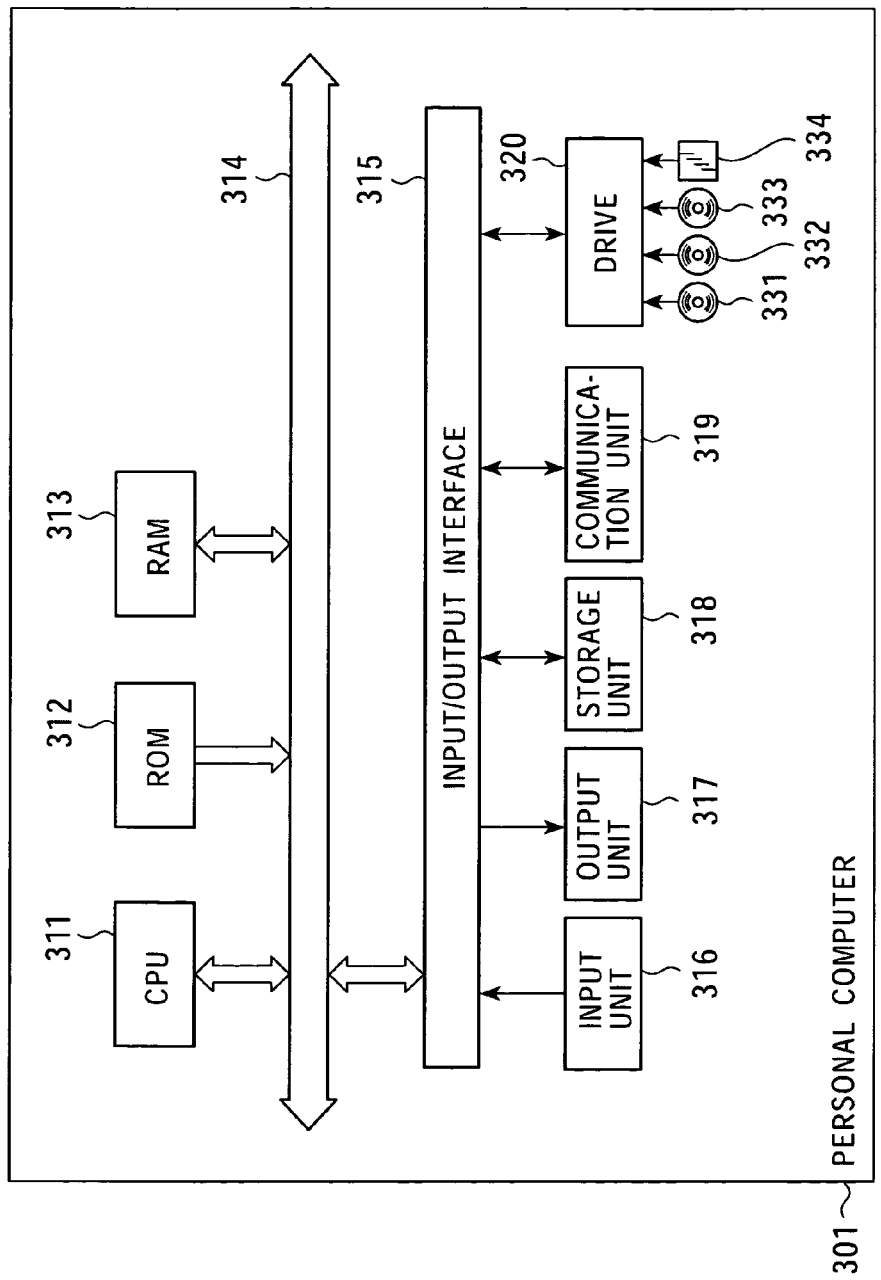
FIG. 18 is a block diagram showing the configuration of a personal computer.

In FIG. 18, a central processing unit (CPU) 311 executes various processes according to a program stored in a read-only memory (ROM) 312 or a program loaded from a storage unit 318 to a random-access memory (RAM) 313. Also, data required for the CPU 311 to execute the various processes is stored in the RAM 313 as necessary.

The CPU 311, the ROM 312, and the RAM 313 are mutually connected through a bus 314. An input/output interface 315 is also connected to the bus 314.

Further, an input unit 316 including a keyboard and a mouse, an output unit 317 including a display and a speaker, the storage unit 318 including a hard disk, and a communication unit 319 including a modem and a terminal adaptor are connected to the input/output interface 315. The communication unit 319 performs communication through a network, such as the Internet.

Also, a drive 320 is connected to the input/output interface 315 as necessary, and a magnetic disk 331, an optical disk 332, a magneto-optical disk 333, or a semiconductor memory 334 is loaded thereto. Accordingly, a computer program is read therefrom and is installed into the storage unit 318 as necessary.

In order to allow the software to perform the series of processes, a program constituting the software is installed through a network or a recording medium to a computer incorporated into dedicated hardware or to a multi-purpose personal computer which can perform various functions by installing various programs thereto.

The recording medium may be a removable package medium which is distributed to a user for providing a program and which stores the program, such as the magnetic disk 331 (including a floppy disk), the optical disk 332 (including a compact disk-read only memory (CD-ROM) and a digital versatile disk (DVD)), the magneto-optical disk 333 (including a MiniDisc (trademark)), or the semiconductor memory 334, as shown in FIG. 18. Alternatively, the recording medium may be the ROM 312 or the hard disk included in the storage unit 318, which is provided to a user while being incorporated in the main body of an apparatus and which stores a program.

In this specification, the steps describing the program which is to be stored in the recording medium may be performed in time series according to the described order. Alternatively, the steps may be performed in parallel or independently.

What is claimed is:

1. A picture processing apparatus for encoding picture data, comprising:

obtaining means for obtaining, from picture data output by a decoder decoding an intraframe stream with a high bit rate, information about a past encoding process performed on the picture data, the information including picture type, a bit rate in an immediate preceding encoding process and a past quantization value, wherein the picture type including an I-picture, a P-picture and a B-picture;

setting means for setting a quantization value;

quantization means for performing quantization based on the quantization value set by the setting means; and encoding means for encoding coefficient data quantized by the quantization means into a data stream with a low bit rate, wherein, when the picture type is not the I-picture, the setting means (a) selects a minimum quantization value based upon the bit rate in the immediate preceding encoding process, from a plurality of minimum quantization values each of which is set according to a bit rate, as a minimum value in a range of quantization values, (b) determines when the past quantization value, obtained from said obtaining means, is smaller than the selected minimum quantization value, (c) when the past quantization is smaller, sets the quantization value at a value equal to the selected minimum quantization value and (d) when the past quantization is not smaller, sets the quantization value to the past quantization value, wherein, when the picture type is the I-picture, the setting means sets the larger value of the past and the selected minimum quantization values as the quantization value.

2. A picture processing apparatus according to claim 1, wherein, when the past quantization value, which was used in the past encoding process and which is included in the information obtained by the obtaining means, is reusable, the setting means sets the larger value of the past and the selected minimum quantization values as the quantization value.

3. A picture processing apparatus according to claim 1, wherein, when a part to be quantized in the picture data corresponds to a part which can be encoded without referring to another part and the past quantization value, which was used in the past encoding process and which is included in the information obtained by the obtaining means, is reusable, the setting means sets the larger value of the past and the selected minimum quantization values as the quantization value.

4. A picture processing apparatus according to claim 3, wherein, when a part to be quantized in the picture data is an intraframe, the setting means determines that the part can be encoded without referring to another part.

5. A picture processing apparatus according to claim 3, wherein, when a part to be quantized in the picture data is an intra-slice, the setting means determines that the part can be encoded without referring to another part.

6. A picture processing apparatus according to claim 3, wherein, when a part to be quantized in the picture data is an intra-macroblock, the setting means determines that the part can be encoded without referring to another part.

7. A picture processing apparatus according to claim 1, further comprising storage means for storing the plurality of minimum quantization values corresponding to the bit rate in the immediately preceding encoding process.

8. A picture processing method for encoding picture data by a picture processing apparatus, the method comprising the steps of: a judging step of judging whether or not a quantization value is reusable, the picture data being output by a decoder decoding an intraframe stream with a high bit rate and the picture data including information about the quantization value used in a past encoding process performed on the picture data and the information also including picture type and a bit rate in an immediate preceding encoding process, wherein the picture type including an I-picture, a P-picture and a B-picture; and when the picture type is not the I picture a setting step of (a) selecting a minimum quantization value based upon the bit rate in the immediate preceding encoding process, from a plurality of minimum quantization values each of which is set according to a bit rate, as a minimum value in a range of quantization values, (b) determining when the quantization value is smaller than the selected minimum quantization value, (c) when the quantization value is smaller, setting the quantization value at a value equal to the selected minimum quantization value, and (d) when the quantization value is not smaller, reusing the quantization value when it has been judged in the judging step that the quantization value included in the information is reusable, wherein stream data is re-encoded into a data stream with a low bit rate, wherein when the picture type is the I-picture, setting the larger value of the past and the selected minimum quantization values as the quantization value.

9. A non-transitory computer readable medium encoded with a computer-readable program for allowing a computer to execute a process of encoding picture data, the program comprising the steps of: a judging step of judging whether or not a quantization value is reusable, the picture data being output by a decoder decoding an intraframe stream with a high bit rate and the picture data including information about the quantization value used in a past encoding process performed on the picture data and the information also including picture type and a bit rate in an immediate preceding encoding process, wherein the picture type including an I-picture, a P-picture and a B-picture; and when the picture type is not the I-picture, a setting step of (a) selecting a minimum quantization value based upon the bit rate in the immediate preceding encoding process, from a plurality of minimum quantization values each of which is set according to a bit rate, as a minimum value in a range of quantization values, (b) determining when the quantization value is smaller than the selected minimum quantization value, (c) when the quantization value is smaller, setting the quantization value at a value equal to the selected minimum quantization value, and (d) when the quantization value is not smaller, reusing the quantization value when it has been judged in the judging step that the quantization value included in the information is reusable, wherein stream data is re-encoded into a data stream with a low bit rate, wherein when the picture type is the I-picture, setting the larger value of the past and the selected minimum quantization values as the quantization value.

10. A computer program, embodied on a non-transitory computer readable medium, for allowing a computer to execute a process of encoding picture data, the program comprising the steps of: a judging step of judging whether or not a quantization value is reusable, the picture data being output by a decoder decoding an intraframe stream with a high bit rate and the picture data including information about the quantization value used in a past encoding process performed on the picture data and the information also including a picture type and a bit rate in an immediate preceding encoding process, wherein the picture type including an I-picture, a P-picture and a B-picture; and when the picture type is not the I-picture, a setting step of (a) selecting a minimum quantization value based upon the bit rate in the immediate preceding encoding process, from a plurality of minimum quantization values each of which is set according to a bit rate, as a minimum value in a range of quantization values, (b) determining when the quantization value is smaller than the selected minimum quantization value, (c) when the quantization value is smaller, setting the quantization value at a value equal to the selected minimum quantization value, and (d) when the quantization value is not smaller, reusing the quantization value when it has been judged in the judging step that the quantization value included in the information is reusable, wherein stream data is re-encoded into a data stream with a low bit rate, wherein when the picture type is the I-picture, setting the larger value of the past and the selected minimum quantization values as the quantization value.

11. An information processing apparatus for converting picture data, comprising:
 decoding means for completely or incompletely decoding a supplied intraframe stream with a high bit rate into picture data; and
 encoding means for encoding, to a mid-stage or completely, the picture data of a base band which has been completely decoded by the decoding means or the picture data which has been incompletely decoded by the decoding means so as to be encoded to a mid-stage,
 the encoding means comprising:
  obtaining means for obtaining, from the supplied picture data, information about a past encoding process performed on the picture data, the information including picture type, a bit rate in an immediate preceding encoding process and a past quantization value, wherein the picture type including an I-picture, P-picture and B-picture;
  setting means for setting a quantization value;
  quantization means for performing quantization based on the quantization value set by the setting means; and
  encoding means for encoding coefficient data quantized by the quantization means into a data stream with a low bit rate,
  wherein, when the picture type is not the I-picture, the setting means (a) selects a minimum quantization value based upon the bit rate in the immediate preceding encoding process, from a plurality of minimum quantization values each of which is set according to a bit rate, as a minimum value in a range of quantization values, (b) determines when the past quantization value, obtained from said obtaining means, is smaller than the selected minimum quantization value, (c) when the past quantization value is smaller, sets the quantization value at a value equal to the selected minimum quantization value, and (d) when the past quantization value is not smaller, sets the quantization value to the past quantization value,
  wherein, when the picture type is the I-picture, the setting means sets the larger value of the past and the selected minimum quantization values as the quantization value.

12. An information processing method for a picture processing apparatus for converting picture data, including:
 decoding means for completely or incompletely decoding a supplied intraframe stream with a high bit rate into picture data; and
 encoding means for encoding, to a mid-stage or completely, the picture data of a base band which has been completely decoded by the decoding means or the picture data which has been incompletely, decoded by the decoding means so as to be encoded to a mid-stage,
 the method of the encoding means comprising the steps of:
  an obtaining step of obtaining, from the supplied picture data, information about a past encoding process performed on the picture data, the information including a picture type, a bit rate in an immediate preceding process and a past quantization value, wherein the picture type including the I-picture, a P-picture and a B-picture;
  a setting step of setting a quantization value;
  a quantization step of performing quantization based on the quantization value set by the setting step; and
  an encoding step of encoding coefficient data quantized by the quantization step into a data stream with a low bit rate,
  wherein, when the picture type is not the I-picture, (a) selecting a minimum quantization value based upon the bit rate in the immediate preceding process, from a plurality of minimum quantization values each of which is set according to a bit rate, as a minimum value in a range of quantization values, (b) determining when the past quantization value, obtained in the obtaining step, is smaller than the selected minimum quantization value, (c) when the past quantization is smaller, setting the quantization value at a value equal to the selected minimum quantization value, and (d) when the past quantization is not smaller, setting the quantization value to the past quantization value,
  wherein, when the picture type is the I-picture, setting the larger value of the past and the selected minimum quantization values as the quantization value.

13. A non-transitory computer readable medium encoded with a computer-readable program for allowing a computer to execute a process for converting picture data, of an information processing apparatus including: decoding means for completely or incompletely decoding a supplied intraframe stream with a high bit rate into picture data; and encoding means for encoding, to a mid-stage or completely, the picture data of a base band which has been completely decoded by the decoding means or the picture data which has been incompletely decoded by the decoding means so as to be encoded to a mid-stage, the program for the encoding means comprising the steps of: an obtaining step of obtaining, from the supplied picture data, information about a past encoding process performed on the picture data, the information including picture type, a bit rate in an immediate preceding process and a past quantization value, wherein the picture type including an I-picture, a P-picture and a B-picture; a setting step of setting a quantization value; a quantization step of performing quantization based on the quantization value set by the setting step; and an encoding step of encoding coefficient data quantized by the quantization step into a data stream with a low bit rate, wherein, when the picture type is not the I-picture, (a) selecting a minimum quantization value based upon the bit rate in the immediate preceding process, from a plurality of minimum quantization values each of which is set according to a bit rate, as a minimum value in a range of quantization values, (b) determining when the past quantization value, obtained in the obtaining step, is smaller than the selected minimum quantization value, (c) when the past quantization value is smaller, setting the quantization value at a value equal to the selected minimum quantization value, and (d) if the past quantization value is not smaller, setting the quantization value to the past quantization value, wherein, when the picture is the I-picture, setting the larger value of the past and the selected minimum quantization values as the quantization value.

14. A picture processing apparatus for encoding picture data, comprising:
 obtaining means for obtaining, from picture data output by a decoder decoding an intraframe stream with a high bit rate, a picture type and a past quantization value used in a past encoding process performed on the picture data, the picture type including an I-picture, a P-picture and a B-picture;

selecting means for selecting a quantization value, based upon a bit rate in an immediate preceding encoding process, from a plurality of minimum quantization values each of which is set according to a bit rate and setting the selected quantization value as a minimum value in a range of quantization values;

setting means for setting a quantization value when the picture type is not the I-picture, used in a re-encoding process performed on the picture data, to the selected quantization by selecting means, when the past quantization value obtained by obtaining means is smaller than the selected quantization value by the selecting means and for setting the quantization value when the picture type is the I-picture, by setting the larger value of the past and the selected minimum quantization values as the quantization value; and re-encoding means for re-encoding the picture data using the set quantization value by the setting means into a data stream with a low bit rate.

15. A picture process apparatus according to claim 14, wherein when the selected quantization by the selecting means is smaller than the past quantization value, the setting means sets a quantization value used in a re-encoding process performed on the picture data to the past quantization value obtained by obtaining means.

16. A picture processing method for encoding picture data by a picture processing device, comprising the steps of:

obtaining, from picture data output by a decoder decoding an intraframe stream with a high bit rate, a picture type and a past quantization value used in a past encoding process performed on the picture data;

selecting a quantization value, based upon a bit rate in an immediate preceding encoding process, from a plurality of minimum quantization values each of which is set according to a bit rate and setting the selected quantization value as a minimum value in a range of quantization values;

when the picture type is not the I-picture, setting a quantization value, used in a re-encoding process performed on the picture data, to the selected quantization, when the past quantization value is smaller than the selected quantization value and when the picture type is the I-picture, setting the larger value of the past and the selected minimum quantization values as the quantization value; and e-encoding the picture data using the set quantization value into a data stream with a low bit rate.

17. A picture processing method according to claim 16, wherein when the selected quantization is smaller than the past quantization value, setting a quantization value used in a re-encoding process performed on the picture data to the past quantization value.

* * * * *